(12) United States Patent
Burghardt et al.

(10) Patent No.: US 12,372,978 B2
(45) Date of Patent: Jul. 29, 2025

(54) VEHICLE AUTONOMY ARCHITECTURE

(71) Applicant: Joby Aero, Inc., Santa Cruz, CA (US)

(72) Inventors: Michael Alexei Burghardt, Santa Cruz, CA (US); Simon Scott, San Francisco, CA (US); Michael Laurenzi, Santa Cruz, CA (US); Rurik Primiani, Miami, FL (US)

(73) Assignee: Joby Aero, Inc., Santa Cruz, CA (US)

( * ) Notice: Subject to any disclaimer, the term of this patent is extended or adjusted under 35 U.S.C. 154(b) by 440 days.

(21) Appl. No.: 17/857,662

(22) Filed: Jul. 5, 2022

(65) Prior Publication Data

US 2023/0004174 A1 Jan. 5, 2023

Related U.S. Application Data

(60) Provisional application No. 63/218,113, filed on Jul. 2, 2021.

(51) Int. Cl.
*G05D 1/24* (2024.01)
*B64C 39/02* (2023.01)
(Continued)

(52) U.S. Cl.
CPC ............ *G05D 1/24* (2024.01); *B64C 39/024* (2013.01); *G05D 1/0088* (2013.01); *G05D 1/104* (2013.01);
(Continued)

(58) Field of Classification Search
None
See application file for complete search history.

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2698749 A1 2/2014
(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.
(Continued)

*Primary Examiner* — Peter D Nolan
*Assistant Examiner* — Michael F Whalen
(74) *Attorney, Agent, or Firm* — Dority & Manning, P.A.

(57) ABSTRACT

Systems and methods for controlling aerial vehicles are provided. An aerial vehicle includes a single circuit board with a number of processor devices and a memory including instructions to perform autonomy operations. The autonomy operations include obtaining GNSS data from GNSS assemblies electrically connected to the processor devices, APNT data from APNT assemblies electrically connected to the processor devices, and radar data from the radar assemblies electrically connected to the processor devices. Each of the assemblies are disposed on the same circuit board that includes the number of processor devices. The processor devices determine a vehicle location based on the GNSS data, the APNT data, and the radar data, identify airborne objects based on the radar data, generate a motion plan based on the vehicle location and the identified objects, and initiate a motion of the aerial vehicle based on the vehicle location.

20 Claims, 13 Drawing Sheets

(51) Int. Cl.
*G05D 1/00* (2006.01)
*G05D 1/245* (2024.01)
*G05D 1/248* (2024.01)
*G05D 1/46* (2024.01)

(52) U.S. Cl.
CPC ............. *G05D 1/245* (2024.01); *G05D 1/248* (2024.01); *G05D 1/46* (2024.01); *B64U 2201/10* (2023.01); *B64U 2201/104* (2023.01); *B64U 2201/20* (2023.01)

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 9,205,930 B2 | 12/2015 | Yanagawa |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,304,344 B2 | 5/2019 | Moravek et al. |
| 10,330,482 B2 | 6/2019 | Chen et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2010/0079342 A1 | 4/2010 | Smith et al. |
| 2014/0179535 A1 | 6/2014 | Stückl et al. |
| 2015/0378936 A1* | 12/2015 | Danielsson ......... G06F 12/1458 711/163 |
| 2016/0311529 A1 | 10/2016 | Brotherton-Ratcliffe et al. |
| 2017/0197710 A1 | 7/2017 | Ma |
| 2017/0357914 A1 | 12/2017 | Tulabandhula et al. |
| 2018/0018887 A1 | 1/2018 | Sharma et al. |
| 2018/0053425 A1 | 2/2018 | Adler et al. |
| 2018/0216988 A1 | 8/2018 | Nance |
| 2018/0308366 A1 | 10/2018 | Goel et al. |
| 2018/0354636 A1 | 12/2018 | Darnell et al. |
| 2019/0146508 A1 | 5/2019 | Dean et al. |
| 2019/0221127 A1 | 7/2019 | Shannon |
| 2019/0227826 A1* | 7/2019 | Taylor ................. G05D 1/0011 |
| 2019/0316849 A1 | 10/2019 | Abrego et al. |
| 2020/0103922 A1 | 4/2020 | Nonami et al. |
| 2020/0218288 A1* | 7/2020 | Johnson ................ B64U 30/26 |
| 2020/0388166 A1 | 12/2020 | Rostamzadeh et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

VEHICLE AUTONOMY ARCHITECTURE

RELATED APPLICATIONS

This application claims priority to and the benefit of U.S. Provisional Patent Application No. 63/218,113, filed Jul. 2, 2021, which is hereby incorporated by reference in its entirety.

FIELD

The present disclosure relates generally to vehicle technology. More particularly, the present disclosure relates to an autonomy computing architecture for aerial vehicles.

BACKGROUND

A wide variety of modes of transport are available within cities. For example, people can walk, ride a bike, drive a car, take public transit, or use a ride sharing service. As population densities and demand for land increase, however, many cities are experiencing problems with traffic congestion and the associated pollution. Consequently, there is a need to expand the available modes of transport in ways that can reduce the amount of traffic without requiring the use of large amounts of land. Air travel within cities can reduce travel time over purely ground-based approaches and alleviate problems associated with traffic congestion. Vertical takeoff and landing (VTOL) aircraft provide opportunities to incorporate aerial transportation into transport networks for cities and metropolitan areas. VTOL aircraft require much less space to take-off and land than other types of aircraft, making them more suitable for densely populated urban environments.

SUMMARY

Aspects and advantages of embodiments of the present disclosure will be set forth in part in the following description, or can be learned from the description, or can be learned through practice of the embodiments.

Aspects of the present disclosure are directed to a circuit board in communication with one or more device controllers of an aerial vehicle. The circuit board includes a processor device and a plurality of sensor assemblies electrically connected to the processor device. The plurality of sensor assemblies include one or more global navigation satellite system (GNSS) assemblies, one or more alternative position navigation and timing (APNT) assemblies, and one or more radio detection and ranging (RADAR) assemblies. In addition, the circuit board includes one or more memory devices storing computer-readable instructions that when executed cause the processor device to implement a guidance system and a flight control system. The guidance system is configured to generate one or more motion plans for an aerial vehicle and the flight control system is configured to provide one or more actuator commands associated with the one or more motion plans to the one or more device controllers.

Other aspects of the present disclosure are directed to an aerial vehicle. The aerial vehicle includes an arrangement of a plurality of circuit boards mounted to the aerial vehicle. Each circuit board of the plurality of circuit boards is located at a different position onboard the aerial vehicle. The arrangement of the plurality of circuit boards includes a control hierarchy indicative of a primary circuit board and one or more redundant circuit boards for performing each of one or more aerial vehicle tasks. Each circuit board of the plurality of circuit boards includes a processor device and a plurality of sensor assemblies electrically connected to the processor device. The plurality of sensor assemblies include one or more global navigation satellite system (GNSS) assemblies, one or more alternative position navigation and timing (APNT) assemblies, and one or more radio detection and ranging (RADAR) assemblies. In addition, each circuit board includes one or more memory devices storing computer-readable instructions that when executed cause the processor device to implement a surveillance system, a localization system, a guidance system, and a flight control system. The surveillance system, the localization system, the guidance system, and the flight control system are configured to perform the one or more aerial vehicle tasks.

Yet other example aspects of the present disclosure are directed to another aerial vehicle. The vehicle includes one or more processor devices and one or more non-transitory computer-readable media that collectively store instructions that, when executed by the one or more processors, cause the computing system to perform operations. The operations include obtaining global navigation satellite system (GNSS) data from one or more GNSS assemblies electrically connected to the one or more processor devices. The operations include obtaining alternative position navigation and time (APNT) data from one or more APNT assemblies electrically connected to the one or more processor devices. The operations include obtaining radio detection and ranging (radar) data from the one or more radar assemblies electrically connected to the one or more processor devices. The operations include determining a vehicle location based, at least in part, on the GNSS data, the APNT data, and the radar data. The operations include initiating a motion of the aerial vehicle based, at least in part, on the vehicle location.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
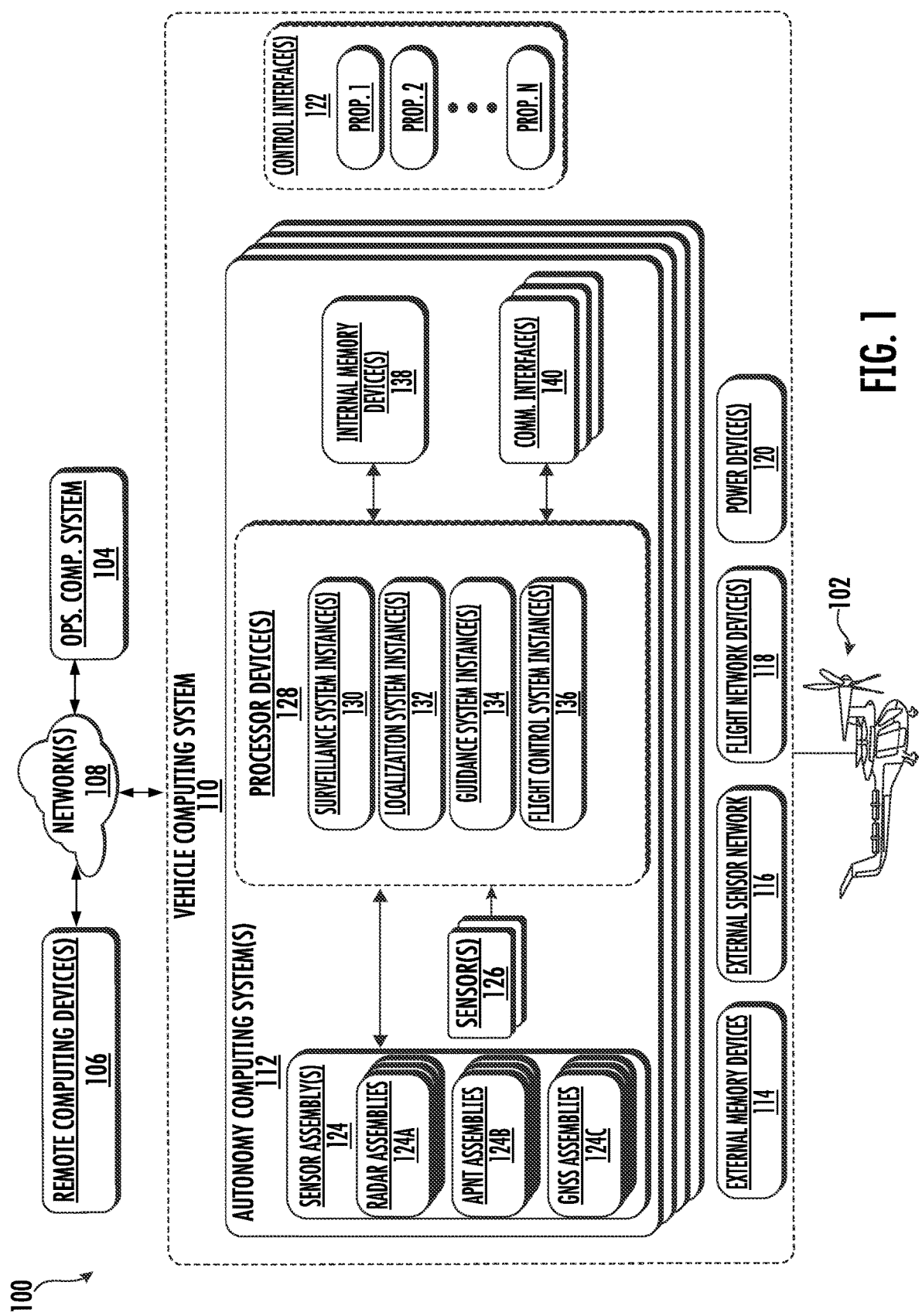
FIG. 1 depicts a block diagram of an example system for an autonomous vehicle according to example embodiments of the present disclosure.

Example aspects of the present disclosure are directed to improved autonomy computing architectures and techniques for aerial vehicles. An aerial vehicle can include a number of different hardware and software components for facilitating autonomous flight. Such components can include a number of different propulsion devices (e.g., rotor assemblies, electric motors, turbines, etc.) and an autonomy system configured to communicate with the propulsion devices to initiate motion of the aerial vehicle. For example, the aerial vehicle can be a vertical takeoff and landing (VTOL) aircraft that is all-electric powered, hybrid-electric powered, etc. In order to lower weight, size, power, cost, and bandwidth requirements for implementing various functions of an autonomy computing system, the present disclosure presents a single circuit board including the components that allow an aerial vehicle to autonomously travel. The circuit board can include a number of processor devices (e.g., a system on a chip platform including a number of processors, a field-programmable gate array, internal storage, etc.) and a number of different hardware sensor assemblies (e.g., global navigation satellite systems, alternative position navigation and timing systems, radar systems, etc.) electrically connected (e.g., via circuit tracks, conductive wiring, etc. of the circuit board) to the processor devices. In addition, the circuit board can include a number of memories storing software (e.g., computer-readable instructions) for implementing various autonomy systems (e.g., surveillance systems, localization systems, guidance systems, flight control systems, etc.) to enable autonomous flight. This can allow for improved location tracking through the implementation of triple redundant localization techniques. Moreover, as will be further described herein, the circuit board can be reconfigurable to allow for efficient integration with various vehicles and redundant for intelligent and selective distribution of autonomy tasks. In this manner, the technology of the present disclosure can improve autonomy systems in general by decreasing bandwidth requirements and increasing processing speeds for sensor data used for safely performing autonomous operations. For instance, the autonomy system of the present disclosure can minimize the amount of data copied from one location (e.g., a receiver, etc.) to another (e.g., a processing system, etc.) by digitizing sensor data (e.g., analog data) received at an antenna receiver with processor device(s) (e.g., device(s) configured to implement autonomy functions of the aerial vehicle) mounted to the same board as the receiver.

The autonomy system of the present disclosure can be mounted to a vehicle of any modality such as, for example, an aerial-based vehicle, as well as a ground-based, water-based, and/or space-based modalities. For instance, the vehicle can include an aerial vehicle. As an example, the aerial vehicle can include any type of vertical take-off and landing aircraft (e.g., VTOL, electric VTOL, etc.), fixed-wing aircraft, rotorcraft, tilt-rotor aircraft, tilt-prop aircraft, tilt-wing aircraft, helicopter, jet craft, and/or other types of aerial vehicle. The aerial vehicle can include one or more propulsion devices (e.g., rotor assemblies, electric motors, turbines, etc.) for initiating motion (e.g., flight maneuvers, take-off maneuvers, landing maneuvers, etc.) of the aerial vehicle. Each propulsion device can include a corresponding device controller (e.g., electric speed controllers, etc.) for controlling the speed, direction, and/or any other characteristic of the propulsion device. For instance, each device controller can receive actuator commands (e.g., from an onboard computing system, a remote computing system, one or more input devices, etc.) and generate instructions for a corresponding propulsion device based, at least in part, on the received actuator commands. The actuator commands, for example, can be data packets, signals, etc. generated and provided to the device controllers by an autonomy computing system onboard the aerial vehicle.

For instance, the aerial vehicle can be an autonomous and/or semi-autonomous aerial vehicle controlled (e.g., at least partly) by an autonomy computing system. The autonomy computing system can include components and circuitry to enable the aerial vehicle to travel autonomously, without human input for at least some time period. For instance, the autonomy computing system can include a single circuit board (e.g., a printed circuit board (PCB), substrate, and/or any other physical sheet of insulating material for mounting and connecting electrical equipment) configured to receive raw sensor data and control propulsion device(s) to autonomously operate the aerial vehicle. The circuit board can include one or more board layers (e.g., a single-sided circuit board, a double sided circuit board, a multi-layered circuit board, etc.). The board layer(s) can include at least one substrate layer and at least one conductive layer. For example, the circuit board can include a physical board that can mechanically support and electrically connect electrical components using conductive tracks, pads, and/or other features etched from one or more sheet layers of a conductive material (e.g., copper and/or any other conductive material) laminated onto and/or between sheet layers of non-conductive substrate. The circuit board can include electrical components to enable the performance of aerial vehicle task(s) for safe autonomous mobility. For example, each board can include hardware and software for implementing one or more surveillance system(s), localization system(s), guidance system(s), and/or flight control system(s).

In some implementations, the aerial vehicle can include one or more external components onboard the aerial vehicle in addition to the circuit board (e.g., autonomy computing system). For example, the vehicle can include one or more external memories (e.g., a high speed data recorder, random access memory(s), solid state drive(s), etc.), one or more sensors (e.g., LiDAR sensors, external radar sensors, image sensors, correctional sensor networks, etc.), a power network (e.g., battery(s) configured to power the components onboard the aircraft, etc.), and/or one or more flight network device(s) (e.g., external communication interfaces and/or other aerial vehicle instruments configured to consume outputs of the autonomy system and/or provide external inputs to the autonomy system, etc.). Each external component can be connected to the circuit board via one or more communication interfaces such as, for example, via one more ethernet connections. The ethernet connections, for example, can include a distribution network of one or more power over ethernet cables (e.g., gigabit ethernet cables, etc.) configured to distribute power and data across a plurality of different device(s) onboard the aerial vehicle.

Ethernet and/or other wired (or wireless) data transfer connections can have limited bandwidth capabilities and require information to be copied from (e.g., via a wired or wireless connection) a source location (e.g., a sensor receiver/digitizing front end, etc.) to a destination location (e.g., a flight computer, processor devices, etc.). Such limitations can be disadvantageous for transferring data used in real-time autonomy operations. To overcome such limitations, the circuit board (e.g., the autonomy computing system) of the present disclosure can connect components used in real-time autonomous flight via one or more conductive layer connections of the circuit board. For example, the circuit board can include at least one conductive layer with a plurality of circuit tracks for electrically connecting all of the components (e.g., to allow for autonomous flight, etc.) disposed on (e.g., mounted to, located on, etc.) the circuit board.

More particularly, the circuit board can include one or more processor devices (e.g., a flight computer) and a plurality of sensor assemblies disposed on (e.g., mounted to, attached to, located on, etc.) the circuit board. The one or more processor devices can include a system on a chip platform including a programmable logic, a processing system, an internal memory, and/or I/O interface(s). The processing system, for example, can include a plurality of processors such as one or more microprocessors (e.g., ARM A53 processor(s), ARM R5 processor(s), etc.) and/or one or more graphics processing units (e.g., Mali-400 MP2(s), etc.). The programmable logic can include one or more field-programmable gate arrays with a plurality (e.g., nine hundred and thirty thousand, etc.) of logic cells (e.g., single level cells, etc.), a plurality (e.g., four thousand two hundred and seventy two, etc.) of arithmetic logic units (e.g., DSP48s, etc.), and/or a programmable memory.

The plurality of sensor assemblies can include global navigation satellite system (GNSS) assembly(s), alternative position navigation and timing (APNT) assembly(s), and/or radio detection and ranging (radar) assembly(s). In some implementations, the circuit board can include additional sensor(s) such as, for example, one or more inertial measurement unit (IMU) sensor(s) (e.g., three IMU sensor(s), one or more barometer(s) (e.g., three barometers, etc.), magnetometer(s) (e.g., three magnetometers, etc.), and/or any other sensor for autonomous flight. By way of example, the inertial measurement unit(s) can include a three axis gyroscope and a three axis accelerometer. In addition, or alternatively, the additional sensor(s) can include one or more external air data sensor(s) such as, for example, one or more pitot tubes, one or more multi-function probes or vanes, and/or any combination thereof.

The plurality of sensor assemblies (and/or additional sensor(s)) can be disposed on (e.g., mounted to, attached to, located on, etc.) the circuit board and electrically connected to the processor device(s) (e.g., the field-programmable gate array) via one or more circuit tracks etched into conductive layer(s) of the circuit board or otherwise implemented on the circuit board (e.g., by conductive traces, etc.). In this manner, sensor information (e.g., analog sensor signals, digitalized sensor signals, etc.) can be communicated directly to the processor device(s).

The GNSS assembly(s) can include at least one GNSS receiver antenna disposed on (e.g., mounted, attached, located, etc.) the circuit board and/or a software defined receiver for providing GNSS data to the processor devices via board circuitry (e.g., internal bus circuitry, circuit tracks, and/or any other circuitry of the circuit board) of the circuit board. In this manner, GNSS data (e.g., analog signals, etc.) received by GNSS receiver antenna(s) can be directly communicated to a field-programmable gate array configured to process the GNSS data (e.g., digitalize the GNSS data, etc.). The GNSS assembly(s) can include any type of GNSS assembly such as, for example, one or more global positioning system(s) (GPS), European satellite navigation system(s) (Galileo), global navigation satellite system(s) (GLONASS), BeiDou system(s), etc. In some implementations, the GNSS assemblies can include at least two GPS receivers (e.g., one or more L1/L5 receivers) and/or at least two Galileo receivers (e.g., one or more E1/E5 receivers).

The APNT assembly(s) can include at least one APNT receiving antenna disposed on (e.g., mounted, attached, located, etc.) the circuit board and a software defined receiver (e.g., down samplers, etc.) for providing APNT data (e.g., analog signals, etc.) to the processor devices via board circuitry (e.g., internal bus circuitry, circuit tracks, and/or any other circuitry of the circuit board) of the circuit board. In this manner, APNT data received by APNT receiver antenna(s) can be directly communicated to a field-programmable gate array configured to process (digitalize, etc.) the APNT data. The APNT assembly(s) can include any type of APNT assembly such as, for example, one or more cellular network receivers, pseudolite receivers, ultra-wide band receivers, etc. In some implementations, the APNT assembly(s) can include radar assemblies and the APNT data can include alternative positioning and navigation radar data. For instance, in some implementations, the APNT assembly(s) can include radar assemblies such that the APNT assembly(s) can use the radar signal to communicate directly with ground beacons. This implementation may provide for the omission of separate and/or additional hardware dedicated to APNT functionality while still providing capability for explicit processing of the APNT functionality.

The radar assemblies can include at least one radar receiving antenna and at least one radar transmitter antenna disposed on the circuit board and software defined receivers (e.g., radio frequency up/down converters, etc.) for providing radar data (e.g., analog signals, etc.) to the processor devices via board circuitry (e.g., internal bus circuitry, circuit tracks, and/or any other circuitry of the circuit board) of the circuit board. In this manner, radar data received by the radar receiver antenna(s) can be directly communicated to a field-programmable gate array configured to process (e.g., digitalize, etc.) the radar data. In some implementations, the radar assembly(s) can include a plurality (e.g., four, sixteen, etc.) of radar receiving antennas and a plurality (e.g., four, sixteen, etc.) of radar transmitter antennas.

The circuit board (and/or the processor device(s) thereof) can include one or more memory(s) storing computer-readable instructions for controlling one or more (e.g., in some cases all) aspects of autonomous flight. For example, the instructions can include instructions for implementing a surveillance system, a localization system, a guidance system, and/or a flight control system. Each of the systems can be configured to perform one or more aerial vehicle task(s). For example, the surveillance system can be configured to perform surveillance task(s) such as, for example, identifying object(s), identifying and/or assessing one or more weather conditions, identifying and/or assessing one or more terrains, landing zones, emergency landing zone, etc. within the surrounding environment of the aerial vehicle. The localization system can be configured to perform localization task(s) such as, for example, determining a current location, velocity, attitude, angular velocity, etc. for the aerial vehicle. The guidance system can be configured to perform motion planning task(s) such as, for example, generating motion plan(s) for the aerial vehicle based, at least in part, on the current location of the vehicle and identified object(s) within the surrounding environment of the vehicle. The flight control system can be configured to perform actuator command task(s) such as, for example, generating and/or providing actuator command(s) associated with the motion plan(s) to one or more device controller(s) of the aerial vehicle.

In this manner, the autonomy computing system (e.g., the processor devices of the circuit board) can receive sensor data (e.g., radar, GNSS, APNT data, etc.) directly from the respective sensor assembly(s) (e.g., radar, GNSS, APNT assemblies, etc.) disposed on the circuit board via board circuitry (e.g., internal bus circuitry, circuit tracks, and/or any other circuitry of the circuit board) of the circuit board and process the sensor data to generate actuator command (s). For example, the autonomy computing system can determine a vehicle location for the aerial vehicle based, at least in part, on the radar data, the GNSS data, and the APNT data. For instance, as described herein, the system can perform triple redundant dissimilar location techniques to determine accurate vehicle location estimates.

In addition, the system can determine one or more object locations for object(s) proximate to the aerial vehicle based, at least in part, on the radar data. For example, the radar data (e.g., digitalized analog radio signals, etc.) can be input to an object detection algorithm including one or more classical algorithm(s), machine-learning model(s) (e.g., a neural network, etc.) and/or any other computing function configured to detect (and/or facilitate the detection of) one or more airborne objects (e.g., location, speed, altitude, etc.) based on raw radar data samples. The object detection algorithm, for example, can be implemented and/or trained (e.g., using one or more machine-learning techniques (e.g., unsupervised, supervised, etc.)) to identify and/or track airborne (and/or other) objects. As an example, an object detection machine-learning model can be trained via backpropagation using labelled training data indicative of raw sensor signals and corresponding objects (and/or the location, speed, altitude, etc. thereof). In some implementations, the radar data can be used in conjunction with and/or to validate data from other sensor systems or positioning systems, such as automatic dependent surveillance-broadcast (ADS-B) data.

Moreover, the system can determine flight maneuver(s) based, at least in part, on the vehicle location and/or the object location(s). For instance, the system can determine the flight maneuver(s) based, at least in part, on the performance of trajectory planning and/or obstacle avoidance. The flight maneuver(s), for example, can include one or more directional movements to avoid an airborne object, create a buffer distance between the aerial vehicle and the airborne object, and/or perform one or more landing/take-off/navigation procedures.

By way of example, the system can be configured to perform a landing zone assessment in preparation for a landing maneuver. To do so, the system can input raw radar signals (e.g., digitalized analog radio signals) indicative of a landing area to a semantic landing assessment algorithm including one or more classical algorithm(s), machine-learned model(s) (e.g., neural network, etc.) configured (e.g., trained, etc.) to output one or more semantic labels based, at least in part, on the input radar signals. The semantic labels, for example, can identify one or more object(s) within a landing area of the aerial vehicle. As another example, the system can determine an occupancy grid. The system can determine an equation of a plane for each grid point of the occupancy grid and determine whether a landing area is occupied based on the slope, altitude, and/or variance of the equation. This approach can be implemented through one or more classical computing algorithms.

As another example, the autonomy computing system can initiate a motion of the aerial vehicle based, at least in part, on the vehicle location, the flight maneuvers, and/or the object(s) proximate to the aerial vehicle. To do so, the system can generate actuator command(s) based, at least in part, on the one or more flight maneuvers and provide the actuator command(s) to one or more device controller(s) of the aircraft.

In some implementations, the autonomy computing system can store (e.g., in a high speed data recorder) data indicative of the vehicle location, the object location(s), and/or the flight maneuver(s) in memory (e.g., an external memory external to the circuit board) onboard the aerial vehicle. The stored data can be compared to correctional data to determine one or more modification(s) for the autonomy system (e.g., processor device(s) thereof and/or instruction(s) stored therein). For example, the autonomy computing system can receive, via one or more communication interfaces (e.g., wired/wireless interfaces, etc.), correctional data from an external sensor network onboard the aerial vehicle. The correctional data can include, for example, additional data (e.g., LiDAR data, image data, etc.) recorded by one or more external sensor(s) (e.g., LiDAR sensors, cameras, etc. connected via one or more wired/wireless interface(s)) of the external sensor network onboard the aerial vehicle but not disposed on the circuit board. The autonomy computing system can store the correctional data on a high speed data recorder onboard the aerial vehicle. In this manner, the data indicative of the vehicle location, the object location(s), and/or the flight maneuver(s) can be compared to the correctional data (e.g., out-of-the-loop such as when the vehicle is grounded, etc.) to determine modification(s) for the autonomy computing system (e.g., debug software, maintain hardware, etc.).

As described herein, the autonomy computing system can utilize a plurality of sensor processing techniques for determining a current vehicle location. As an example, the system can perform triple redundant localization using at least three dissimilar signal receivers electrically connected to the circuit board. The current vehicle location, for example, can include a geospatial position (and/or any other positional reference) including lateral coordinate(s), longitudinal coordinate(s), and/or altitude measurement(s). The system can determine a current vehicle location based, at least in part, on a plurality of position estimates generated using at least three dissimilar localization techniques. The vehicle location can be determined by applying a voting algorithm (e.g., stored in memory of the circuit board, etc.) to the plurality of position estimates to obtain a consensus current vehicle location.

By way of example, the autonomy computing system can determine one or more first, second, and/or third position estimates for the aerial vehicle at a respective time. The first position estimate(s) can be determined based, at least in part, on GNSS data received from the one or more GNSS assemblies. The GNSS data, for example, can include one or more navigation satellite signals (e.g., GPS satellite signals, Galileo satellite signals, etc.). The navigation satellite signals, for instance, can include one or more radio time signals received along a line of sight from one or more of a constellation of navigation satellites by the GNSS assembly(s) (e.g., antennas thereof). The one or more radio time signals (e.g., digitalized signals, etc.) can be processed by the autonomy computing system (via one or more GNSS processing techniques) to determine at least one first position estimate for the aerial vehicle.

The autonomy computing system can determine the second position estimate(s) for the aerial vehicle at the respective time based, at least in part, on APNT data received from the APNT assembly(s). The APNT data, for example, can include one or more network signal(s) (e.g., cellular network signals, pseudolite signals, ultra-wide band signals, etc.). The network signal(s), for instance, can include one or more radio signals received from one or more network access points (and/or pseudolites, etc.) by the APNT assembly(s) (e.g., antennas thereof). As an example, the network signals can include cellular network signals indicative of one or more cellular access points within range of the APNT assembly(s). In such a case, the autonomy computing system can determine an access point location for each of the cellular access points (e.g., via a look-up table and/or information from the network signals) and determine at least one second position estimate based, at least in part, on the access point location for each of the cellular access points. As other examples, the network signals can include one or more radio signals received from pseudolite(s), ultra-wide band access point(s), and/or any other alternative positioning, navigation, and timing sources. In such a case, the radio signals can be processed (e.g., via one or more respective APNT processing techniques) to determine additional second position estimates for the aerial vehicle.

The autonomy computing system can determine the third position estimate(s) for the aerial vehicle at the respective time based, at least in part, on radar data received from the radar assembly(s). The radar data can include one or more radar signals. The radar signals can be processed by the autonomy computing system, via one or more processing techniques, to determine a third position estimate. For example, the radar signal(s) can be processed using one or more radar odometry techniques. The radar odometry techniques, for example, can include determining a positional change for the aerial vehicle from a starting time to the respective time based, at least in part, on the radar signals and determining at least one of the one or more third position estimates by applying the positional change to a starting position of the aerial vehicle. As another example, the radar signal(s) can be processed using one or more radar terrain reference navigation techniques. For example, the radar signal(s) (e.g., digitalized analog radio signals, etc.) can be indicative of a terrain within a surrounding environment of the aerial vehicle. In such a case, the autonomy system can determine a third position estimate based, at least in part, on a comparison between the terrain and a pre-determined terrain navigation map. As yet another example, the radar signal(s) can be processed using one or more radar beacon techniques. For instance, the radar data can be indicative of beacon signals received from one or more passive and/or active radar beacons. The autonomy system can determine one or more beacon positions for the one or more radar beacons based, at least in part, on the beacon signals and determine at least one third position estimate based, at least in part, on the beacon position(s) (and/or an estimated distance therefrom).

In some implementations, the autonomy computing system (e.g., the circuit board) can be reconfigurable to apply to a plurality of different vehicle types. By way of example, the same autonomy computing system (e.g., circuit board) can be reconfigured (e.g., without hardware changes) to control any of a plurality of different types of aerial vehicles. For example, an aerial vehicle can be associated with an aerial vehicle type (e.g., subscale vehicles, full scale vehicles, eVTOLs, etc.). Each respective aerial vehicle type of the plurality of aerial vehicle types can be associated with one or more respective aerodynamic models (e.g., data descriptive of a pitch, roll, yaw, torque, speed, center of gravity, and/or any other characteristic of a vehicle type) and/or radar sampling parameters (e.g., expected signal noise, sampling frequencies, etc.). The aerodynamic models/sampling parameters, for example, can be based, at least in part, on the size, weight, layout, and/or any other physical/electrical characteristics of a respective vehicle type. The autonomy computing system can be configured for a respective aerial vehicle associated with a respective vehicle type by storing one or more motion models (e.g., descriptive of motion parameters (e.g., pitch, roll, yaw, torque, and/or any other parameters for generating desired movements based on a center of gravity and/or other characteristics of an aircraft)) and/or radar sampling parameters (e.g., expected signal noise, sampling frequencies, etc.) corresponding to the respective aerial vehicle type on one or more memories of the autonomy computing system.

By way of example, the autonomy computing system can be initially configured for a first aerial vehicle associated with a first vehicle type. In such a case, the one or more memories of the autonomy computing system can include one or more computer-readable instructions for implementing the various systems of the autonomy computing system (e.g., surveillance system, localization system, guidance system, flight control system, etc.) that include one or more first motion parameters and/or first radar sampling parameters corresponding to the first vehicle type. The one or more first motion parameters and/or first radar sampling parameters can be based, at least in part, on the one or more respective aerodynamic models associated with the first vehicle type.

The one or more memories of the same autonomy computing system can be modified to reconfigure the reconfigurable circuit board for use on a second aerial vehicle. The one or more modified memories can include modified computer-readable instructions for implementing the various systems of the autonomy computing system (e.g., surveillance system, localization system, guidance system, flight control system, etc.) that include one or more second motion parameters and/or second radar sampling parameters corresponding to the second vehicle type. The one or more second motion parameters and/or second radar sampling parameters, for example, can be based, at least in part, on the one or more respective aerodynamic models associated with the second vehicle type.

In some implementations, the aerial vehicle can include multiple redundant autonomy computing systems. For example, the aerial vehicle can include a plurality of circuit boards, with each circuit board capable of performing all aerial vehicle tasks to enable autonomous flight. The multiple redundant circuit boards can be placed in a plurality of different arrangements relative to the aerial vehicle. For example, the aerial vehicle can include an arrangement of a plurality of circuit boards disposed on the aerial vehicle. Each respective circuit board in the arrangement of the plurality of circuit boards can be associated with a respective position relative to the aerial vehicle. For example, the aerial vehicle can define a front side, a first lateral side, a second lateral side opposite the first lateral side, and/or a rear side opposite the front side. The plurality of circuit boards can include a front circuit board disposed on (e.g., mounted to, attached to, affixed to, located at, etc.) the front side (e.g., where the field of view of the sensors of the circuit board are facing forward/downward from the aerial vehicle, etc.) of the aerial vehicle, a first lateral side circuit board disposed on (e.g., mounted to, attached to, affixed to, located at, etc.) the first lateral side of the aerial vehicle, and a second lateral side circuit board disposed on (e.g., mounted to, attached to, affixed to, located at, etc.) the second lateral side of the aerial vehicle.

In some implementations, the arrangement of the plurality of circuit boards can include a control hierarchy identifying which board controls each autonomy task for the aerial vehicle. For example, the control hierarchy can identify one or more primary circuit board(s) (e.g., controlling board(s)) and/or one or more redundant circuit boards (e.g., noncontrolling board(s)) for performing each of the one or more aerial vehicle tasks. The control hierarchy can be based, at least in part, on the respective position of each respective circuit board in the arrangement of the plurality of circuit boards. For instance, the control hierarchy can identify the front circuit board as the primary circuit board for the performance of surveillance (e.g., object detection, weather assessment, terrain assessment, landing zone assessment, emergency landing zone assessment, etc.), motion planning, and/or actuator command task(s). In addition, or alternatively, the control hierarchy can identify the first lateral side circuit board and the second lateral side circuit board as the primary circuit boards for the performance of the localization task(s) (e.g., determining a current location, velocity attitude, angular velocity, etc. for the aerial vehicle).

Additionally and/or alternatively, in some implementations, the control hierarchy can identify each of the one or more circuit boards as redundant (e.g., noncontrolling) circuit boards for performing each of the one or more vehicle tasks. For instance, the control hierarchy may not include a primary circuit board in some implementations. Signals from each redundant circuit board can be treated equally, and signals representing a majority value (e.g., a voting-based majority) can be used for performance of surveillance (e.g., object detection, weather assessment, terrain assessment, landing zone assessment, emergency landing zone assessment, etc.), motion planning, and/or actuator command task(s). Signals from boards can be considered individually for determining majority values.

In some implementations, the control hierarchy can dynamically change based, at least in part, on the direction of travel and/or the phase of flight of the aerial vehicle. A phase of flight, for example, can be indicative of whether the aerial vehicle is in a planning phase, a take-off phase, a climb phase, a cruise phase, a descent phase, an approach phase, a taxi phase, etc. By way of example, the control hierarchy can identify the primary board for the performance of the surveillance, motion planning, and/or actuator command task(s) as the board (e.g., sensors thereof) with a field of view overlapping the aerial vehicle's direction of travel. In such a case, the control hierarchy can identify the primary board for the performance of the localization task(s) as the boards (e.g., sensors thereof) with a field of view that does not overlap the aerial vehicle's direction of travel. As an example, the primary board for the performance of the surveillance, motion planning, and/or actuator command task(s) can include the front board in the event that the aerial vehicle is traveling up, down, or straight and/or generally in the forward direction. In addition, or alternatively, the primary board for the performance of the surveillance, motion planning, and/or actuator command task(s) can include the first and/or second lateral side circuit boards in the event the aerial vehicle is hovering (and/or otherwise moving) laterally (e.g., in a first lateral direction, a second lateral direction, or both). This allows for a reconfigurable and real-time selection of onboard computing resources to perform the various autonomous functions of the aerial vehicle in a manner tailored to the current operating parameters of the aerial vehicle.

The systems and methods described herein provide a number of technical effects and benefits. For instance, the present disclosure provides an improved autonomy architecture for facilitating autonomous flight. The autonomy architecture can be included on a single circuit board, therefore allowing sensor data to be digitalized directly to a flight computer configured to process the data for autonomy operations. As a result, the autonomy computing system of the present disclosure can reduce latency in autonomy systems by reducing data copies needed to perform autonomous operations. Moreover, including all of the components on a single board can reduce the weight, size, power, and cost requirements for aerial computing systems therefore enabling lighter, smaller, and more cost efficient aircraft. In addition, example aspects of the present disclosure can provide an improvement to computing technology, such as localization computing technology. For instance, the system of the present disclosure provides for a triple redundant dissimilar localization technique for improving localization accuracy for aircraft by combining newly available combinations of data (e.g., GNSS, APNT, RADAR, etc.) to reduce localization error. Moreover, by implementing the same localization techniques across a plurality of redundant circuit boards, the system of the present disclosure can provide SW redundancy. This, in turn, can reduce overall system positioning error for evaluating aircraft. Additionally, the circuit board of the present disclosure can be reconfigured for use on any vehicle without hardware changes, thereby reducing wasted computing resources and ensuring cross-compatibility across a plurality of different aerial vehicles in a fleet. In this way, the disclosed technology provides a practical improvement to aerial vehicle navigation generally and, more particularly, to the autonomous aerial vehicles.

With reference now to FIGS. 1-13, example embodiments of the present disclosure will be discussed in further detail.

FIG. 1 depicts a block diagram of an example system 100 for a vehicle 102 according to example embodiments of the present disclosure. The system 100 can include a vehicle 102 with a vehicle computing system 110. The vehicle computing system 110 can include an onboard vehicle computing system disposed on (e.g., mounted to, affixed to, located in, etc.) the vehicle 102. The vehicle computing system 110 can be in communication over one or more network(s) 108 with remote computing device(s) 106 and/or an operations computing system 104.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or passengers thereof to coordinate a vehicle service provided by the vehicle 102. To do so, the operations computing system 104 can communicate with the one or more remote computing device(s) 106 and/or the vehicle 102 via one or more communications networks including the communications network 108.

The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and/or radio frequency) and/or any desired network topology (or topologies). For example, the communications network 108 can include a local area network (e.g., intranet), wide area network (e.g., the Internet), wireless LAN network (e.g., via Wi-Fi), cellular network, a SATCOM network, VHF network, a HF network, a WiMAX based network, airborne network, ATN based channels, and/or any other suitable communications network (or combination thereof) for transmitting data to/from/between the vehicle 102, the remote device(s) 106, and/or the operations computing system 104.

Each of the one or more remote computing device(s) 106 can include one or more processors and one or more memory devices. The one or more memory devices can be used to store instructions that when executed by the one or more processors of the one or more remote computing device(s) 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102.

The remote computing device(s) 106 can include one or more computing devices such as, for example, one or more operator devices (e.g., pilot device(s), driver device(s), etc.) associated with one or more vehicle operators (e.g., pilot(s), drivers, etc.), passenger devices associated with one or more vehicle passengers, developer devices associated with one or more vehicle developers (e.g., a laptop/tablet computer configured to access computer software of the vehicle computing system 110, the autonomy computing system 112, etc.), etc. The remote computing device(s) 106 can receive input instructions from a user (e.g., pilot, driver, passenger, developer, etc.) or exchange signals or data with an item or other computing device or computing system (e.g., the operations computing system 104). Further, the remote computing device(s) 106 can be used to determine and/or modify one or more states of the vehicle 102 including a location (e.g., a latitude and longitude), a velocity, an acceleration, a trajectory, a heading, noise level, and/or a path of the vehicle 102 based, at least in part, on signals or data exchanged with the vehicle 102. In some implementations, the operations computing system 104 can include one or more of the remote computing device(s) 106.

Figure 2:
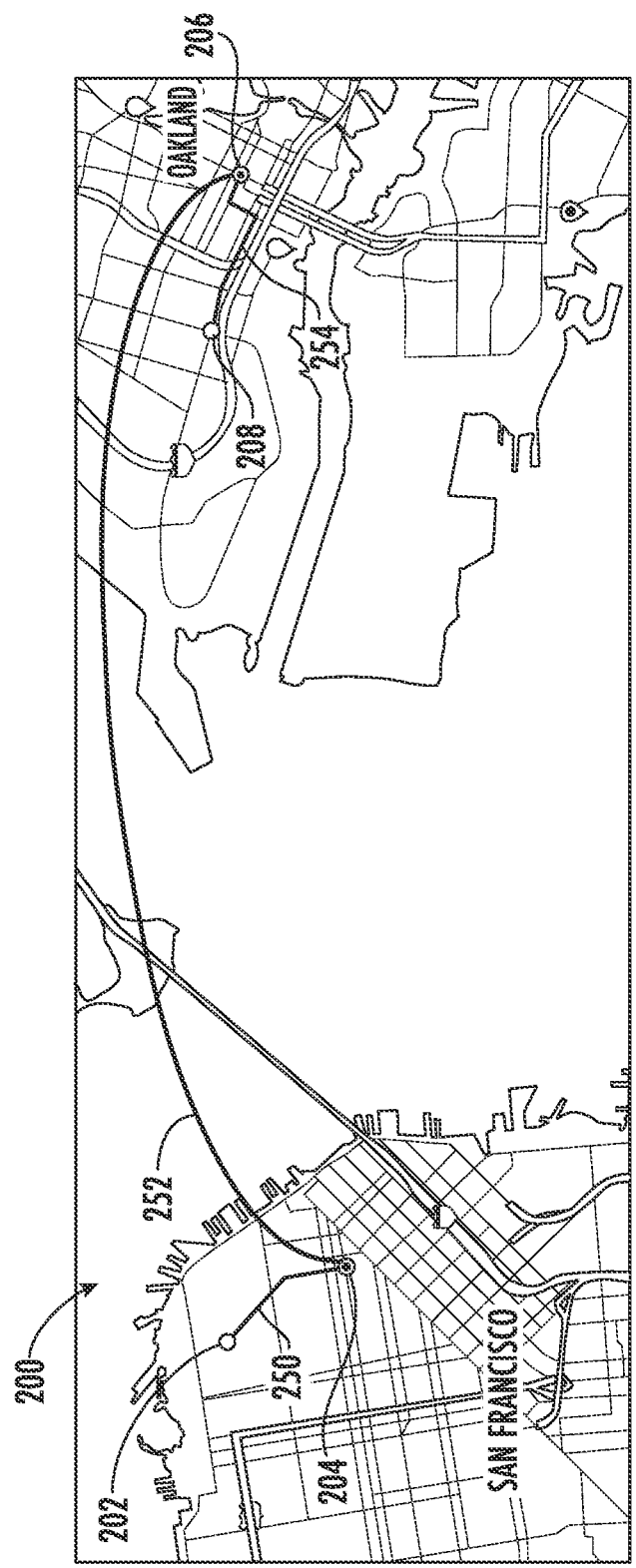
FIG. 2 depicts an example multi-modal transportation itinerary according to example embodiments of the present disclosure.

In some implementations, the operations computing system 104, the remote computing device(s) 106, and the vehicle 102 can facilitate one or more portions of a multi-modal transportation itinerary. By way of example, FIG. 2 depicts a graphical diagram of an example multi-modal transportation service itinerary 200 according to example embodiments of the present disclosure. The itinerary 200 can include two or more transportation legs to transport a passenger from an origin 202 to a destination 208. For example, the itinerary 200 can include a first, ground-based (e.g., car-based) transportation leg 250 which transports the passenger from the origin 202 to a departure transportation node 204; a second, flight-based transportation leg 252 which transports the passenger from the departure transportation node 204 to an arrival transportation node 206; and a third, ground-based (e.g., car-based) transportation leg 254 which transports the passenger from the arrival transportation node 206 to the destination 208.

Figure 3:
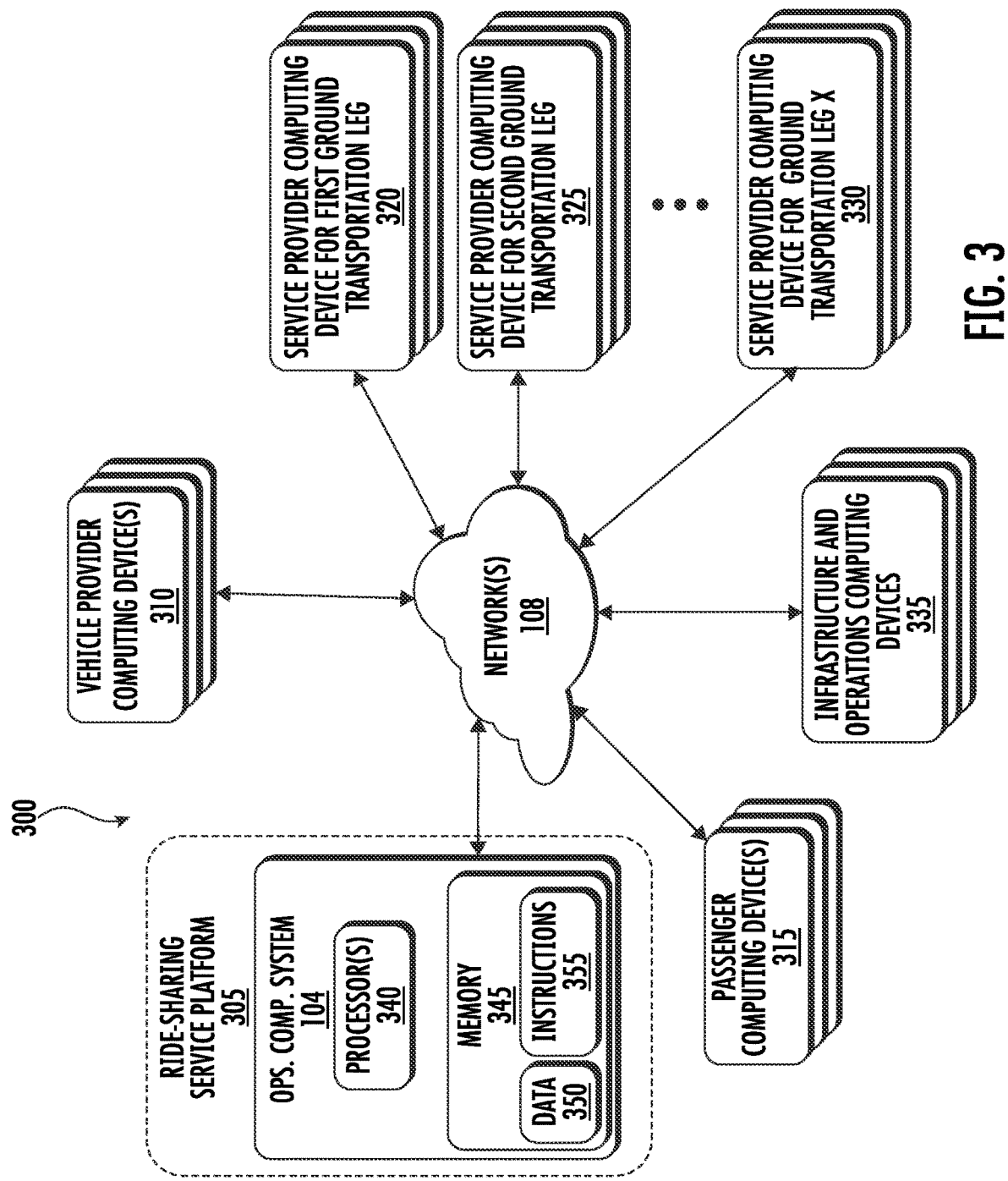
FIG. 3 depicts an example system for facilitating a multi-modal transportation itinerary according to example embodiments of the present disclosure.

FIG. 3 depicts an example system 300 for facilitating a multi-modal transportation itinerary according to example embodiments of the present disclosure. The system 300 can include the operations computing system 104 that can operate to control, route, monitor, and/or communicate with aircraft (e.g., VTOL aircraft) and/or one or more other transportation service entities (e.g., ground-based vehicle(s), etc.) to facilitate a multi-modal transportation service. The operations computing system 104 can be associated with a ride-sharing service platform 305 that can provide a multi-modal transportation service for passengers, for example, including travel by ground vehicle, travel by aircraft (e.g., VTOL aircraft), travel by watercraft, travel by spacecraft, and/or any combination therebetween. In some implementations, the operations computing system may be a portion of the ridesharing platform and/or controlled by the same entity. In some implementations, the operations computing system can communicate with a computing device of a ridesharing platform operated by a different entity.

The operations computing system 104 can be communicatively connected over the network(s) 108 to one or more vehicle provider device(s) 310, one or more passenger computing device(s) 315, one or more service provider computing devices 320 for a first transportation modality, one or more service provider computing devices 325 for a second transportation modality, one or more service provider computing devices 330 for an Nth transportation modality, and/or one or more infrastructure and operations computing devices 335. Each of the computing devices 310, 315, 320, 325, 330, 335 can include any type of computing device such as a smartphone, tablet, hand-held computing device, wearable computing device, embedded computing device, navigational computing device, vehicle computing device, etc. A computing device can include one or more processors and a memory. Although service provider devices are shown for N different transportation modalities, any number of different transportation modalities can be used, including, for example, less than the three illustrated modalities (e.g., two modalities can be used).

The operations computing system 104 includes one or more processors 340 and a memory 345. The one or more processors 340 can be any suitable processor device (e.g., a processor core, a microprocessor, an ASIC, a GPU, a FPGA, a controller, a microcontroller, etc.) and can be one processor or a plurality of processors that are operatively connected. The memory 345 can include one or more non-transitory computer-readable storage media, such as RAM, ROM, EEPROM, EPROM, one or more memory devices, flash memory devices, etc., and combinations thereof.

The memory 345 can store information that can be accessed by the one or more processors 340. For instance, the memory 345 (e.g., one or more non-transitory computer-readable storage mediums, memory devices) can store data 350 that can be obtained, received, accessed, written, manipulated, created, and/or stored. In some implementations, the operations computing system 104 can obtain data from one or more memory device(s) that are remote from the system 104. The memory 345 can also store computer-readable instructions 355 that can be executed by the one or more processors 340. The instructions 355 can be software written in any suitable programming language or can be implemented in hardware. Additionally, or alternatively, the instructions 355 can be executed in logically and/or virtually separate threads on processor(s) 340.

The operations computing system 104 can facilitate the ability of the passenger to receive transportation on one or more of the transportation legs included in an itinerary. As one example, the operations computing system 104 can interact with one or more ride-sharing networks to match the user with one or more transportation service providers 320, 325, 330. As another example, the operations computing system 104 can book or otherwise reserve a seat in, space on, or usage of one or more of the transportation modalities for a passenger. Additionally, or alternatively, the operations computing system 104 can provide information for options to be provided by one or more third parties for one or more of the transportation legs.

For instance, the operations computing system 104 can respond to a passenger's request for transportation (e.g., provided by a passenger computing device 315) by generating one or more transportation itineraries. As an example, the operations computing system 104 can evaluate an origin and/or destination location associated with the request to identify modes of transportation that are usable at such location (e.g., able to access such locations). For example, the operations computing system 104 can communicate with the vehicle provider computing device(s) 310 and/or the service provider computing device(s) 320, 325, 330 to determine whether one or more service(s) are available for the origin/destination location(s). The operations computing system 104 can provide one or more of the generated itineraries to the passenger (e.g., via the passenger computing device 315). For example, one or more of the best itineraries (e.g., as evaluated based on various characteristics such as cost, time, etc.) can be suggested to the passenger. The passenger can select one of the suggested itineraries to receive transportation services in accordance with the selected itinerary.

In another example, a user can request transportation via a ridesharing network (e.g., ridesharing, ride hailing, etc.). The ridesharing network can communicate with the operations computing system 104 to determine whether aerial transport would be available for the user, cost, times, etc. The operations computing system 104 can provide data associated with aerial transport (e.g., departure/arrival transportation node, flight times, options, etc.). The ridesharing network can obtain this data and generate an itinerary for the user based at least in part on the data (e.g., a three leg itinerary with an aerial transport leg). The user can accept the trip and the ridesharing network can communicate with the operations computing system 104 to reserve a seat for the user for aerial transport.

Turning back to FIG. 1, the system 100 can include a vehicle 102. The vehicle 102 can be configured to perform one or more services such as, for example, one or more transportation service(s) (e.g., at least one leg of an itinerary, etc.). For example, the vehicle 102 can be capable of, assigned to, requested to, programmed for, etc. the service(s). The vehicle 102 can be associated with one or more of the remote device(s) 106 such as, for example, any of the device(s) described with reference to FIG. 3 (e.g., vehicle provider computing device(s) 310, service provider computing device(s) 320, 325, 330, etc.). As an example, the vehicle 102 can be associated with a vehicle provider (e.g., corresponding to a vehicle provider device 310, etc.), a vehicle operator (e.g., corresponding to a service provider computing device 320, 325, 330, etc.), and/or any other entity associated with the performance of a transportation, delivery, etc. service.

The vehicle 102 can be a vehicle of any modality such as, for example, an aerial-based vehicle and/or other modalities (a ground-based, water-based, space-based, etc.). For instance, the vehicle 102 can include an aerial vehicle. As an example, the aerial vehicle can include any type of vertical take-off and landing aircraft (e.g., VTOL, electric VTOL, etc.), short take-off and landing (STOL) aircraft, fixed-wing aircraft, rotorcraft, tilt-rotor aircraft, tilt-prop aircraft, tilt-wing aircraft, helicopter, jet craft, and/or other types of aerial vehicle. The aerial vehicle travels via combustible fuel, electric, hydrogen propelled, and/or other mechanisms. For example, the vehicle 102 can include one or more propulsion devices (e.g., rotor assemblies, electric motors, turbines, etc.) for initiating motion (e.g., flight maneuvers, take-off maneuvers, landing maneuvers, etc.) of the vehicle 102. By way of example, a propulsion device can include an aerodynamic actuator such as, for example, actuators that make use of an articulated or semi-rigid hub (e.g., wherein connection of blades to the hub can be articulated, flexible, rigid, and/or otherwise connected) and/or actuators that make use of a rigid hub (e.g., wherein the connection of blades to the hub can be articulated, flexible, rigid, and/or otherwise connected). Each propulsion device can include a corresponding device controller 122 (e.g., electric speed controllers, etc.) for controlling the speed, direction, and/or any other characteristic of the propulsion device.

The vehicle 102 can include and/or otherwise be associated with a vehicle computing system 110. The vehicle computing system 110, for example, can be disposed (e.g., mounted, attached, positioned, located, etc.) on/within the vehicle 102. The vehicle computing system 110 can include one or more autonomy computing system(s) 112 and/or one or more device(s) 114, 116, 118, 120, 122. The device(s) can include an external memory(s) 114 onboard the vehicle computing system 110 and/or external to the autonomy computing system(s) 112, an external sensor network(s) 116 onboard the vehicle computing system 110 and/or external to the autonomy computing system(s) 112, one or more flight network device(s) 118 onboard the vehicle computing system 110 and/or external to the autonomy computing system(s) 112, one or more power device(s) 120 onboard the vehicle computing system 110 and/or external to the autonomy computing system(s) 112, and/or one or more control device(s) 122 onboard the vehicle computing system 110 and/or external to the autonomy computing system(s) 112.

For instance, in some implementations, the vehicle 102 can be an autonomous and/or semi-autonomous aerial vehicle controlled (e.g., at least partly) by at least one of the autonomy computing system(s) 112 of the vehicle computing system 110. Each autonomy computing system 112 can include components and circuitry to enable the vehicle 102 to travel autonomously, without human input, for at least some time period. For instance, each autonomy computing system 112 can include a single circuit board (e.g., a printed circuit board (PCB), substrate, and/or any other physical sheet of insulating material for mounting and/or connecting electrical equipment) configured to receive raw sensor data (e.g., via sensor assembly(s) 124, additional sensor(s) 126, etc.) and control propulsion device(s) (e.g., via actuator commands to the control device(s) 122, etc.) to autonomously operate the vehicle 102.

The circuit board, for example, can include one or more board layers (e.g., a single-sided circuit board, a double-sided circuit board, a multi-layered circuit board, etc.). The board layer(s) can include at least one substrate layer and at least one conductive layer. For example, the circuit board can include a physical board that can mechanically support and electrically connect electrical components using board circuitry such as, for example, conductive tracks, pads, wiring, and/or other features etched from (and/or affixed to) one or more sheet layers of a conductive material (e.g., copper and/or any other conductive material) laminated onto and/or between sheet layers of non-conductive substrate. The circuit board can include electrical components to enable the performance of aerial vehicle task(s) for safe autonomous mobility. For example, each board can include hardware and software for implementing one or more surveillance system instance(s) 130, localization system instance(s) 132, guidance system instance(s) 134, and/or flight control system instance(s) 136.

The autonomy computing system(s) 112 can be configured to interface with one or more components 114, 116, 118, 120, 122 onboard the aerial vehicle in addition to the autonomy computing system 112 (e.g., circuit board). For example, the vehicle 102 can include one or more external memory(s) 114. The external memory(s) 114 can include any memory device such as, for example, one or more non-transitory computer-readable storage media, such as RAM, ROM, EEPROM, EPROM, flash memory devices, solid state drive(s), etc., and/or combinations thereof. In some implementations, the external memory(s) 114 can include a high speed data recorder (e.g., data logger, etc.) configured to record data over time and/or in relation to a location (e.g., as determined by the data recorder, the localization system instance(s) 132, etc.) of the vehicle 102. The high speed data recorder, for example, can include a digital data logger configured to interface (e.g., via interface(s) 140) with the autonomy computing system(s) 112 to record data received by the autonomy computing system(s) 112 (e.g., sensor data, etc.), data processed by the autonomy computing system(s) 112 (e.g., localization data, object detection data, motion planning data, etc.), and/or data output by the autonomy computing system(s) 112 (e.g., actuator command(s), etc.).

In addition, the vehicle 102 can include one or more external sensor network(s) 116 and/or one or more flight network device(s) 118 (e.g., as further illustrated with reference to FIG. 4). The external sensor network(s) 116, for example, can include one or more LiDAR sensor(s), image sensor(s), correctional sensor network(s), temperature sensor(s), acoustic sensor(s), pressure sensor(s), altimeter(s), and/or any other sensor configured to interface with the autonomy computing system(s) 112 and/or not used in real-time for autonomous flight. As an example, the external sensor network(s) 116 can include a correctional sensor network including a plurality of correctional sensors. The plurality of correctional sensors can be configured to obtain correctional sensor data for use (e.g., out-of-loop when the vehicle 102 is not in use) in modifying one or more functions of the autonomy computing system 112. As other examples, the external sensor network(s) 116 can include an emergency sensor network including a plurality of sensors configured to detect emergency conditions (e.g., loss of cabin pressure, increased temperature, etc.).

The flight network device(s) 118 can include communication interfaces and/or aerial vehicle instruments configured to consume outputs of the autonomy computing system 112 and/or provide external inputs to the autonomy computing system 112. As an example, the flight network device(s) 118 can include component controllers configured to control aircraft surface(s) such as, for example, ailerons, flaps, rudder fins, landing gears, and/or any other operable component of the vehicle 102.

Additionally, or alternatively, the vehicle 102 can include one or more control device(s) 122. The control device(s) 122 can correspond to each of one or more propulsion device(s) (e.g., propeller blades, turbines, etc.) of the vehicle 102. Each control device 122 can receive actuator commands (e.g., from at least one autonomy computing system 112, remote computing device(s) 106, operations computing system 104, etc.). The actuator commands, for example, can include data packets, signals, etc. generated and provided to the control device(s) 122 by the autonomy computing system 112 onboard the vehicle 102 to initiate a motion of the vehicle 102. The control device(s) 122 can receive the actuator commands and generate one or more instructions for a corresponding propulsion device. The control device(s) 122 can execute the one or more instructions to implement the received actuator commands by initiating movement of one or more of the propulsion device(s) (e.g., motors, blades, etc. thereof).

The vehicle 102 can include one or more power device(s) 120 (e.g., battery(s), generator(s), fuel cell(s), fuel tank(s), etc.) configured to provide power to facilitate the operation of each of the components 112, 114, 116, 118, 122 of the vehicle computing system 110. For example, each external component 114, 116, 118, 122 can be connected to the circuit board via one or more communication interfaces 140 of the autonomy computing system 112 such as, for example, via one more ethernet connections. The ethernet connections, for example, can include a distribution network of one or more power over ethernet cables (e.g., gigabit ethernet cables, etc.) configured to distribute power and data across a plurality of different device(s) onboard the vehicle 102. For instance, the distribution network can operate over a shared power and data transmission protocol such as, for example, a Power-over-Ethernet protocol (e.g., ad-hoc, or standardized according to IEEE 802.3 standard, IEEE 802.3af-2003, IEEE 802.3at-2009, PoE+/PoE plus, 802.3bt, Alternative A, Alternative B, 4PPoE, a custom protocol, power over data link protocols ("PoDL"), Aeronautical Radio, Incorporated ("ARINC") protocols, etc.).

The distribution network, for example, can include a physical connection between the power device(s) 120 and each of the components 112, 114, 116, 118, 122 onboard the vehicle 102 that use electricity to operate. The physical connection can function to transmit electrical power from the power device(s) 120 to each component 112, 114, 116, 118, 122. The physical connection can include a first direct connection between at least one battery of the power device(s) 120 and a respective power switch (e.g., a power and data switch, a PoE switch, etc.) and second direct connection between the respective power switch and each respective component 112, 114, 116, 118, 122, such that the power switch can mediate the power provision to each component 112, 114, 116, 118, 122. In some implementations, the first physical connection between the battery and the respective power switch(s) can include a direct conductive connection (e.g., a wired connection) such as, for example, via a high voltage transmission line, high power transmission cabling, etc. and the second physical connection between the respective switch(s) and each component 112, 114, 116, 118, 122 can include an Ethernet-compatible form factor such as, for example, a category 5 cable, category 3 cable, etc.

In this manner, the distribution network can include one or more cables that can communicatively, electrically, and/or physically connect the autonomy computing system(s) 112 to each of the external component(s) 114, 116, 118, 122 of the vehicle computing system 110. The cables can include network cables (e.g., local area network cables), power and data cables (e.g., PoE cables, optical fiber, coaxial cable, serial cable, USB, a bus, etc.), and/or a set of power cables, data cables, etc. By way of example, the cabling can include twisted pair Ethernet cabling, custom cabling, and/or any other set of cabling. The cabling used to connect different component sets can be the same and/or different. Each cable can connect two, three, and/or any number of the components 112, 114, 116, 118, 122 together.

Ethernet and/or other wired (or wireless) data transfer connections can have limited bandwidth capabilities and require information to be copied from (e.g., via a wired or wireless connection) a source location (e.g., a sensor receiver/digitizing front end, etc.) to a destination location (e.g., the autonomy computing system 112, processor device(s) 128, etc.). Such limitations can be disadvantageous for transferring data used in real-time autonomy operations. To overcome such limitations, the circuit board (e.g., the autonomy computing system 112) of the present disclosure can connect components used in real-time autonomous flight via one or more board circuitry (e.g., conductive layer connections of the circuit board). For example, the circuit board can include at least one conductive layer with a plurality of circuit tracks (and/or other forms of board circuitry) for electrically connecting all of the components (e.g., to allow for autonomous flight, etc.) disposed on (e.g., mounted to, located on, etc.) the circuit board.

More particularly, the autonomy computing system 112 can include a circuit board with one or more processor device(s) 128 (e.g., a flight computer, one or more processor(s), one or more programmable logic device(s), etc.) and/or one or more sensor assemblies 124 disposed (e.g., mounted/attached to, located on, etc.) thereon. The sensor assembly(s) 124 can include radio detection and ranging (radar) assembly(s) 124(A), alternative position navigation and timing (APNT) assembly(s) 124(B), and/or global navigation satellite system (GNSS) assembly(s) 124(C). In addition, or alternatively, the autonomy computing system 112 can include sensor(s) 126, one or more internal memory device(s) 138, and/or one or more communication interface(s) 140 disposed on (e.g., mounted/attached to, located on, etc.) thereon. The sensor(s) 126 can include, for example, one or more inertial measurement unit(s), barometer(s), magnetometer(s), and/or any other sensor(s) usable for real-time autonomous flight.

Figure 4:
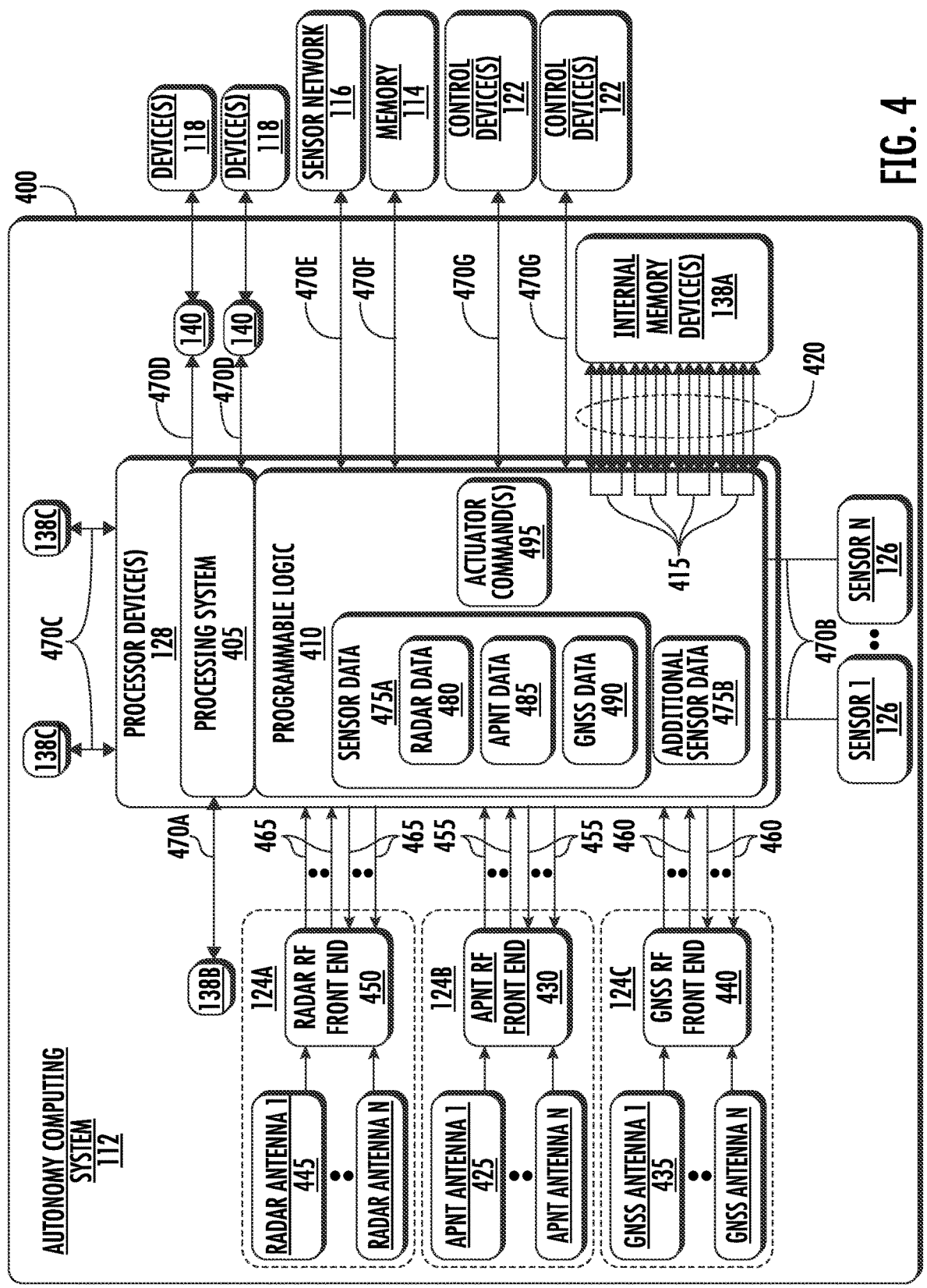
FIG. 4 depicts a block diagram of an example autonomy computing system according to example embodiments of the present disclosure.

More particularly, FIG. 4 depicts a block diagram of an example autonomy computing system 112 according to example embodiments of the present disclosure. As depicted, each autonomy computing system 112 can be a circuit board 400 that includes radar assemblies 124A, APNT assemblies 124B, GNSS assemblies 124C, processor device(s) 128, sensor(s) 126, internal memory device(s) 138A, 138B, 138C, and communication interface(s) 140A, 140B, 140C, 140D, 140E, 140F, 140G.

The processor device(s) 128 can include a processing system 405 and a programmable logic 410. For instance, in some implementations, the processor device(s) 128 can include a heterogeneous compute platform that can include a processing system 405 (e.g., microprocessors, etc.) and a programmable logic 410 (e.g., programmable logic architecture) tied together within a high-bandwidth network-on-chip architecture. By way of example, processor device(s) 128 can include a system on a chip platform including a processing system 405, programmable logic 410, an internal memory 138A, and/or I/O interface(s) such as, for example, route port(s) 415 (e.g., interfacing circuitry, internal bus, PCI bus, etc.).

The processing system 405, for example, can include a plurality of processors such as one or more microprocessors (e.g., ARM A53 processor(s), ARM R5 processor(s), etc.), one or more graphics processing units (e.g., Mali-400 MP2(s), etc.), one or more single instruction, multiple data processors (e.g., SIMD processors, etc.). The programmable logic 410 can include one or more field-programmable gate arrays with a plurality (e.g., nine hundred and thirty thousand, etc.) of logic cells (e.g., single level cells, etc.), a plurality (e.g., four thousand two hundred and seventy two, etc.) of arithmetic logic units (e.g., DSP48s, etc.), and/or a programmable memory (e.g., RAM, ROM, etc.). In addition, or alternatively, the programmable logic 410 can include one or more other programmable logic device(s) such as, for example, any other type of programmable logic arrays, programmable array logics, generic array logics, complex programmable logic device(s), erasable programmable logic device(s), graphics processing units, etc.

The programmable logic 410 can include a plurality of digital circuits configured to implement one or more of a plurality of processing pipelines based, at least in part, on a loaded configuration (e.g., bitstream, etc.). The programmable logic 410 can be configured to support dynamic full/partial reconfiguration. By way of example, a respectively loaded processing pipeline for the programmable logic 410 can be dynamically modified, replaced, etc. during, before, and/or after operation of an aerial vehicle based, at least in part, on the state (e.g., operational state, planned trajectory, location, speed, weather conditions, etc.) of the aerial vehicle. In this manner, the operation of the programmable logic 410 can be dynamically modified to provide on demand processing based, at least in part, on the current state of an aerial vehicle. In this manner, one autonomy computing system 112 can be reconfigured to facilitate a plurality of different aerial functions thereby resulting in lighter aircraft (e.g., requiring less hardware than aircraft using a plurality of single configuration programmable logic configurations) and increased redundancy in aircraft components.

As examples and as further described with reference to FIGS. 6 and 9, a processing pipeline for the programmable logic 410 of at least one of a plurality of redundant autonomy computing systems 112 (e.g., of the vehicle computing system 110) can be modified to load different sensor processing pipelines based, at least in part, on an aerial task (e.g., and/or type of sensor (e.g., radar, etc.) processing needed for a respective task) associated with a respective autonomy computing system 112. As an example, different radar processing pipelines can be tailored to one or more flight modes (e.g., autonomous flight, semi-autonomous flight, manual flight, passenger carrying mode, package carrying mode, etc.), one or more environmental conditions (e.g., rain, heat, fog, etc.), and/or any other factor associated with the operation of an aerial vehicle and/or one or more aerial vehicle tasks associated with a respective autonomy computing system 112. As another example, different sensor processing pipelines can be tailored to identified obstacle types. By way of example, the identification of an obstacle of a certain type (e.g., aerial vehicle type (autonomous, manual, VTOL, etc.), animal type (e.g., birds, etc.), etc.) can trigger (e.g., via a "wake up big brother" architecture) the loading of a respective processing pipeline tailored to the obstacle type. As yet another example, an allocation of GNSS and/or APNT processing pipelines can be distributed among the programmable logic 410 of one or more redundant autonomy computing systems 112 based, at least in part, on a relative signal strength and/or confidence in localization.

The programmable logic 410 can include one or more interface(s) 415 (e.g., one or more route port(s), etc.) to read/write to programmable logic memory device(s) 138A (e.g., one or more solid state drive(s) (SSD(s)) such as (e.g., four SSDs with 2.5 gigabyte/second sequential write per drive, etc.), etc.). The interface(s) 415, for example, can include one or more component interconnect express (PCIe) route port(s) for transferring data (e.g., read/write, etc.) between the programmable logic 410 and the memory device(s) 138A. The interface(s) 415 can include a high-speed computer expansion bus standard defined by a number of lanes 420. In some implementations, the interface(s) 415 can include four PCIe (e.g., PCIe 3.0) route ports with sixteen lanes 420 (e.g., four lanes (e.g., two read/two write) per route port) capable of transferring data at one hundred and twenty-six gigabits per second.

The processor device(s) 128 (e.g., processing system 405, programmable logic 410, etc.) can include one or more additional interface(s) 470A-470G communicatively connecting one or more component(s) of the vehicle computing system. For instance, the processing system 405 can be connected via a primary interface 470A (e.g., one or more SATA-III interface(s), etc.) to one or more processing memory device(s) 138B (e.g., one or more SATA-III solid state drive(s), etc.). The programmable logic 410 can be connected via one or more secondary interface(s) 470B (e.g., low-speed serial via one or more select I/O pins) to one or more sensor(s) 126 (e.g., inertial measurement unit(s), etc.). In addition, or alternatively, the processor device(s) 128 can be connected via one or more ancillary interface(s) 470C (e.g., one or more circuit tracks, conductive wiring, etc.) to one or more ancillary memories 138C (e.g., DDR4 memory device(s), etc.). In some implementations, the one or more sensor(s) 126 can be polled by the programmable logic 410.

In some implementations, the processor device(s) 128 can be connected to one or more external device(s) 114, 116, 118, 122 (e.g., device(s) onboard the vehicle computing system and/or not disposed on the circuit board 400). For instance, the processor device(s) 128 (e.g., processing system 405) can include one or more intermediate ethernet interface(s) 470D (e.g., gigabit ethernet lines, reduced gigabit media independent interface(s), etc.), 470E (ethernet PHY, etc.) connecting the processor device(s) 128 to the flight network device(s) 118. As another example, the processor device(s) 128 (e.g., programmable logic 410) can include one or more interfaces(s) 470E (e.g., ten gigabit ethernet line, etc.), 470F (one hundred gigabit ethernet line, etc.) and/or one or more additional interface(s) (e.g., power over data link (PoDL) lines, lines with one or more bandwidth limits such as 10 Mb/s, 100 Mb/s, 1 Gb/s, 10 Gb/s, 40 Gb/s, etc.) connecting the processor device(s) 128 (e.g., programmable logic 410) to one or more sensor network(s) 116 and/or an external memory 114. As yet another example, the processor device(s) 128 can include one or more interface(s) 470G (e.g., ethernet lines, circuit tracks, conductive wiring, etc.) for connecting the processor device(s) 128 (e.g., programmable logic 410) to the one or more control device(s) 122.

The radio detection and ranging (radar) assembly(s) 124A, alternative position navigation and timing (APNT) assembly(s) 124B, global navigation satellite system (GNSS) assembly(s) 124C, and/or other sensor(s) 126 can be disposed on (e.g., mounted to, attached to, located on, etc.) the circuit board 400 and electrically connected to the processor device(s) 128 (e.g., the programmable logic 410) via board circuitry 455, 460, 465 (e.g., circuit tracks etched into conductive layer(s) of the circuit board 400, one or more conductive wires, internal, peripheral buses, etc.) or otherwise implemented on the circuit board 400 (e.g., by conductive traces, conductive wiring, etc.). In this manner, sensor information (e.g., analog/digitalized sensor signals, etc.) can be communicated directly to the processor device(s) 128.

The APNT assembly(s) 124B can include one or more APNT receiving antenna 425 disposed on (attached, mounted, located, etc.) the circuit board 400 and a APNT radio frequency front end 430 (e.g., software defined receiver, etc.) for providing APNT data (e.g., analog/digitalized radio frequency data) to the processor device(s) 128 (e.g., the programmable logic 410) via one or more interface(s) 455 (e.g., circuit tracks, radio frequency in/out cable(s), etc.) of the circuit board 400. In this manner, APNT data (e.g., radio frequency data, analog data, digitalized radio frequency data, etc.) received by APNT receiver antenna(s) 425 can be directly communicated to a field-programmable gate array (e.g., programmable logic 410) configured to process (e.g., digitalize, etc.) the APNT data. The APNT antenna(s) 425 can include any type of APNT antenna(s) such as, for example, one or more cellular network receivers, pseudolite receivers, ultra-wide band receivers, etc. In some implementations, the APNT antenna(s) 425 can include at least two antennas, for example, to make aircraft heading observable through local real-time kinematic techniques. In some implementations, the APNT assembly(s) can include radar assemblies and the APNT data can include alternative positioning and navigation radar data.

The GNSS assembly(s) 124C can include one or more GNSS receiver antenna(s) 435 disposed on (attached, mounted, located, etc.) the circuit board 400 and an GNSS radio frequency front end 440 (e.g., software defined receiver, etc.) for providing GNSS data to the processor device(s) 128 (e.g., programmable logic 410) via one or more interface(s) 460 (e.g., circuit tracks, radio frequency in/out cable(s), etc.) of the circuit board 400. In this manner, GNSS data (e.g., radio frequency data, analog/digitalized radio frequency signals, etc.) received by GNSS receiver antenna(s) 435 can be directly communicated to a field-programmable gate array (e.g., programmable logic 410) configured to process the GNSS data. The GNSS antenna(s) 435 can include any type of GNSS antenna(s) such as, for example, one or more global positioning system(s) (GPS), European satellite navigation system(s) (Galileo), global navigation satellite system(s) (GLONASS), BeiDou system(s), etc. In some implementations, the GNSS assembly(s) 124C can include at least two GPS receivers (e.g., one or more L1/L5 receivers) and/or at least two Galileo receivers (e.g., one or more E1/E5 receivers).

The radar assemblies 124A can include one or more radar receiving antenna(s) 445 and one or more radar transmitter antenna 445 disposed on (attached, mounted, located, etc.) the circuit board 400 and a radar radio frequency front end 450 (e.g., software defined receiver, radio frequency up/down converter blocks, etc.) for providing radar data to the processor device(s) 128 (e.g., programmable logic 410) via interface(s) 465 (e.g., circuit tracks, radio frequency in/out cable(s), etc.) of the circuit board 400. In this manner, radar data (e.g., radio frequency data, digitalized/analog radio frequency data, etc.) received by the radar receiver antenna(s) 445 can be directly communicated to a field-programmable gate array (e.g., programmable logic 410) configured to process (e.g., digitalize, etc.) the radar data. In some implementations, the radar assembly(s) 124A can include a plurality (e.g., four, sixteen, etc.) of radar receiving antennas 445 and a plurality (e.g., four, sixteen, etc.) of radar transmitter antennas 445.

The radio frequency front end(s) 430, 440, 450 can be configured to provide data indicative of one or more signals to the processor device(s) 128 (e.g., programmable logic 410). The signal(s) can include one or more antenna signal(s) (e.g., received via one or more respective antenna(s), etc.) and/or simulated signal(s) (e.g., recorded and/or generated radio signals, etc.). For instance, the front end(s) 430, 440, 450 can be connected to one or more remote simulation device(s) configured to provide simulation data to the autonomy computing system 112. In this manner, the autonomy computing system 112 can be tested and/or trained using one or more hardware in the loop simulations. By way of example, at least one sensor assembly of the plurality of sensor assemblies 124A-C can include at least one radiofrequency front end 430, 440, 450 disposed on the circuit board (e.g., autonomy computing system). The at least one radiofrequency front end 430, 440, 450 can be configured to receive one or more antenna signals from at least one antenna of the at least one sensor assembly or one or more simulated signals from at least one simulation device. The at least one radiofrequency front end can be configured to provide data indicative of the one or more antenna signals or the one or more simulated signals to the processor device(s) 128 (e.g., programmable logic 410).

Figure 5:
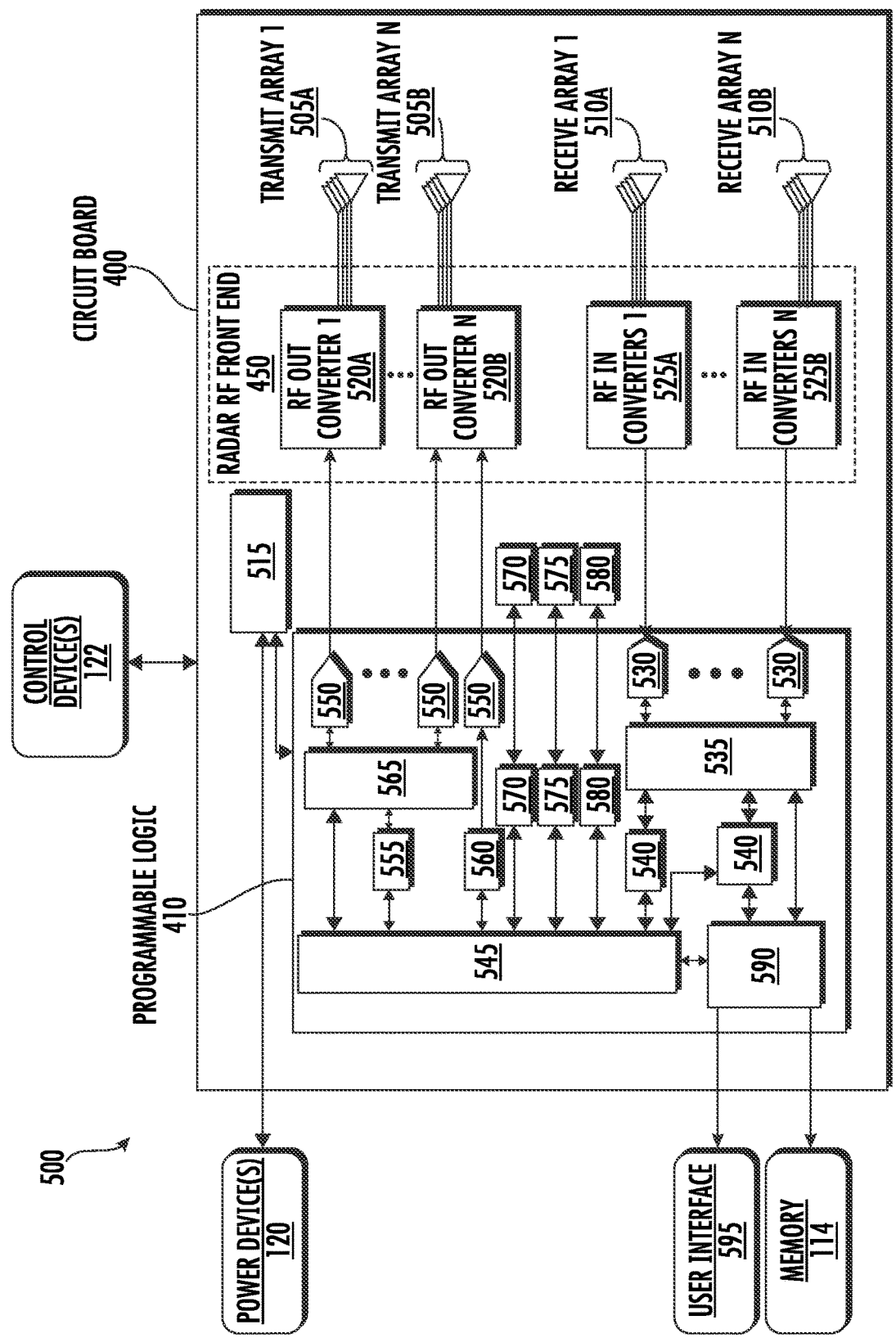
FIG. 5 depicts an example radar assembly design according to example embodiments of the present disclosure.

For example, FIG. 5 depicts an example radar assembly design 500 according to example embodiments of the present disclosure. The radar assembly design 500 can include one or more of radar antenna arrays (e.g., bistatic, monostatic, quasi-monostatic, etc.) 505A, 505B, 510A, 510B disposed on the circuit board 400. The circuit board 400 can include a radar RF front end 450 and programmable logic 410 for receiving, transmitter, and processing radar signals (e.g., electromagnetic waves within various frequencies such as radio, microwave, or millimeter frequencies, etc.) via the one or more radar antenna arrays 505A, 505B, 510A, 510B. The board 400 can include power distribution device(s) 515 for distributing power from one or more power device(s) 120 (e.g., onboard an aerial vehicle) to components (e.g., programmable logic 410, radar RF front end 450, radar antenna array(s) 505A, 505B, 510A, 510B, etc.) of the circuit board 400.

The radar antenna array(s) 505A, 505B, 510A, 510B can include a plurality of transmitter antenna arrays 505A, 505B and/or a plurality of receiver antenna arrays 510A, 510B. The plurality of transmitter antenna arrays 505A, 505B can include any number of transmitter antennas. By way of example, in some implementations, the transmitter antenna arrays 505A, 505B can include four, eight, twelve, sixteen, twenty, or any other number of transmitter antennas (e.g., antennas configured to transmit electromagnetic waves within various frequencies based on analog signals). In some implementations, for example, the transmitter antenna arrays 505A, 505B can include sixteen transmitter antennas.

The plurality of receiver antenna arrays 510A, 510B can include any number of receiver antennas (e.g., antennas configured to receive electromagnetic waves within various frequencies). By way of example, in some implementations, the receiver antenna arrays 510A, 510B can include four, eight, twelve, sixteen, twenty and/or any other number receiver antennas. In some implementations, for example, the receiver antenna arrays 510A, 510B can include sixteen receiver antennas.

The radar antenna array(s) 505A, 505B, 510A, 510B can include any number of different radar antennas configured to operate over any number of radio frequency ranges (e.g., as defined by professional associations such as, for example, the institute of electrical and electronics engineers (IEEE), etc.). For example, the radar antenna array(s) 505A, 505B, 510A, 510B can include a plurality of X-band antennas (e.g., configured to operate over an X-band (e.g., 8-12 GHz) frequency range), KU-band antennas (e.g., configured to operate over a KU-band (e.g., 12-18 GHz) frequency range), K-band antennas (e.g., configured to operate over a K-band (e.g., 18-26 GHz) frequency range), Ka-band (e.g., configured to operate over a Ka-band (e.g., 32.3-33.4 GHz) frequency range) and/or any other antenna types or combinations thereof. By way of example, in some implementations, the radar antenna array(s) 505A, 505B, 510A, 510B can include X-band antennas configured to operate over a 9.3-9.8 GHz frequency range.

The radar antenna array(s) 505A, 505B, 510A, 510B can be positioned in one or more of a plurality of different orientations. As an example, one or more antenna(s) of a respective radar antenna array (e.g., radar antenna array(s) 505A, 505B, 510A, 510B) can be oriented in different configurations to create one or more virtual array patterns. As another example, the one or more antenna(s) of a respective radar antenna array (e.g., radar antenna array(s) 505A, 505B, 510A, 510B) can be oriented in one or more different polarized antenna configurations.

Each of the radar antenna array(s) 505A, 505B, 510A, 510B can be disposed on (e.g., attached, mounted, located, etc.) the circuit board 400 via a respective radio frequency converter 520A, 520B, 525A, 525B. The radio frequency converter(s) 520A, 520B, 525A, 525B, for example, can include one or more radio frequency up converter(s) 520A, 520B corresponding to the transmitter antenna arrays 505A, 505B and/or one or more radio frequency in converter(s) 525A, 525B corresponding to the receiver antenna arrays 510A, 510B.

The radio frequency in converter(s) 525A, 525B can include radio frequency down converter blocks configured to receive analog signals from the receiver antenna arrays 510A, 510B and communicate the analog signals (and/or digital signal(s)) to the programmable logic 410. By way of example, the down converter blocks can include hardware and/or logic for converting high frequency signals (e.g., X-band frequency signals, etc.) to one or more lower frequencies for processing. The radio frequency up converter(s) 520A, 520B can include radio frequency up-converter blocks configured to receive the one or more analog signal(s) and cause the plurality of receiver antenna arrays 510A, 510B to output one or more radio signals based, at least in part, on the analog signal(s). By way of example, the up-converter blocks can include hardware and/or logic for converting and/or amplifying low frequency signals (e.g., intermediate frequency signals, etc.) to one or more higher frequencies for transmission. As described herein, the radio frequency converter(s) 520A, 520B, 525A, 525B can enable multi-modal radar assemblies.

The programmable logic 410 can include circuitry/logic for receiving/processing analog/digitalized radar signals and controlling the radar antenna arrays 505A, 505B, 510A, 510B. For instance, the programmable logic 410 can include one or more analog to digital converter(s) (ADCs) 530. The ADCs 530 can be configured to digitalize the analog radio signal(s) (e.g., down converted intermediate signals, etc.) to generate digitalized radar data (e.g., radar data 480). For example, the ADCs 530 can include integrated circuits configured to receive and convert analog radio signal(s) into one or more digital signal(s). The digital signal(s), for example, can include a two's complement binary number proportional to the respective analog radio signal(s) and/or any other digital representation of analog radio signal(s).

In addition, or alternatively, the programmable logic 410 can include one or more digital to analog converter(s) (DACs) 550. The DACs can receive the digital signals/waveforms (e.g., output by radar controller 545, multi-waveform distribution channel 565, etc.) and convert the digital waveforms to analog data (e.g., intermediate signals, etc.) for transmission by the transmitter antenna(s) 505A, 505B. For example, the DACs 550 can include integrated circuits configured to receive and convert digital signal(s) into one or more analog signal(s). The analog signal(s) can be communicated to the radio frequency up converter(s) 520A, 520B. The radio frequency up converter(s) 520A, 520B can convert and/or amplify the analog signal(s) for transmission.

The programmable logic 410 (e.g., via radar processor 535) can process digitalized radar data, store (e.g., via memory device 540, etc.) the digitalized radar data (and/or information derived from the digitalized radar data), and/or communicate (e.g., via communication interface(s) 590, etc.) the digitalized radar data (and/or information derived from the digitalized radar data) to one or more external device(s) (e.g., external memory device(s) 114, user interface(s) 595, etc.). For example, the programmable logic 410 can include radar processing logic (e.g., radar processor 535). The radar processor 535 can process (e.g., via one or more algorithms, machine-learning models, etc.) the radar data to perform one or more tasks (e.g., determine a current location, object detection, terrain mapping, etc.) described herein. The radar data and/or information derived thereof (e.g., a vehicle location, object location, etc.) can be stored in memory device(s) 540 (e.g., RAM memory (e.g., DDR4), ROM, etc.) and/or output (e.g., via communication interface 590) to one or more remote device(s) such as, for example, external memory(s) 114 (e.g., a high-speed recorder) and/or user device(s) (e.g., remote device(s) 106 described with reference to FIG. 1) for display via user interface(s) 595.

In addition, or alternatively, the programmable logic 410 can include radar controller logic (e.g., radar controller 545) configured to synchronize and/or otherwise control radar signal output by the radar antenna array(s) 510A, 510B. The radar controller 545 can be configured to control each of the radar antenna array(s) 505A, 505B, 510A, 510B to perform radar scans for collecting the radar data. The radar controller 545 can include and/or be associated with one or more oscillator(s) 570 (e.g., STALO, etc.), one or more control interface(s) 575 (e.g., RFFE COMMS, etc.), one or more timing device(s) 580 (e.g., timing clock, etc.) and/or any other hardware/software components for synchronizing/controlling one or more parameter(s) (e.g., pulse length, timing, width, power, etc.) for completing one or more different radar observations (e.g., terrain mapping, moving object detection, etc.). For example, the radar controller 545 can be configured to generate one or more transmission (TX) waveforms 555, reference waveforms 560, etc. The transmission waveforms 555 (and/or other transmission parameter(s)) can be input to a multi-antenna waveform distribution logic 565 for processing based, at least in part, on the radar antenna array(s) 510A, 510B. Digital instructions can be converted to analog signal(s) (e.g., via DAC(s) 550) for transmission by radar antenna array(s) 510A, 510B.

The radar assembly design 500 can enable multi-modal radar antenna array(s) 505A, 505B, 510A, 510B capable of operating in a number of different modes (e.g., pulsed mode(s) (e.g., noncoherent, coherent (e.g., low, medium, high pulse repetition frequency, etc.), continuous wave mode(s) (e.g., frequency modulated, etc.), etc.) to obtain radar data tailored to each aerial vehicle task for autonomous flight (e.g., via electronic beam steering, electronic beam forming, etc.). For example, the radar controller 545 can cause the transmitter antenna array(s) 505A, 505B to operate according to a first mode to obtain radar data indicative of one or more moving objects. In addition, or alternatively, the radar controller 545 can cause the transmitter antenna array(s) 505A, 505B to operate according to other modes for localizing the aircraft, determining an aircraft maneuver, etc. In some implementations, the radar assembly design 500 can include one or more radar lenses (e.g., optical lenses, etc.) on top of the antenna array(s) to filter one or more received signals, etc.

With reference to FIGS. 1 and 4, the autonomy computing system 112 (e.g., processor device(s) 128 of the circuit board 400) can receive sensor data 475A (e.g., radar data 480, APNT data 485, GNSS data 490, etc.) directly from the respective sensor assembly(s) (e.g., radar 124A, APNT 124B, GNSS 124C assemblies, etc.) disposed on the circuit board 400 via one or more interface(s) 455, 460, 465 (e.g., circuit tracks, conductive wiring, computer buses, etc.) of the circuit board 400 and process the sensor data 475A to generate actuator command(s) 495 (e.g., for the control device(s) 122). In addition, or alternatively, the autonomy computing system 112 (e.g., processor device(s) 128 of the circuit board 400) can receive additional sensor data 475B (e.g., IMU data, etc.) directly from the sensor(s) 126 (e.g., IMU sensor(s), etc.) disposed on the circuit board 400 via one or more interface(s) 470B (e.g., circuit tracks, conductive wiring, computer buses, etc.) of the circuit board 400 and process the additional sensor data 475B to generate actuator command(s) 495 (e.g., for the control device(s) 122). For example, the autonomy computing system 112 can determine a vehicle location for the aerial vehicle based, at least in part, on the radar data 480, the GNSS data 490, the APNT data 485, and/or the additional sensor data 475B. For instance, as described herein, the system 112 can perform triple redundant dissimilar location techniques to accurately determine vehicle location estimates.

The autonomy computing system 112 (e.g., circuit board 400) can include one or more internal memory(s) 138 storing computer-readable instructions for controlling one or more (e.g., in some cases all) aspects of autonomous flight. For example, the instructions can include instructions for implementing surveillance system instance(s) 130, localization system instance(s) 132, guidance system instance(s) 134, and/or flight control system instance(s) 136. Each of the systems can be configured to perform one or more vehicle task(s). For example, the surveillance system 130 can be configured to perform surveillance task(s) such as, for example, identifying object(s), identifying and/or assessing one or more weather conditions, identifying and/or assessing one or more terrains, landing zones, emergency landing zone, etc. within the surrounding environment of the aerial vehicle 102. The localization system 132 can be configured to perform localization task(s) such as, for example, determining a current location, velocity, attitude, angular velocity, etc. for the vehicle 102. The guidance system 134 can be configured to perform motion planning task(s) such as, for example, generating motion plan(s) for the vehicle 102 based, at least in part, on the current location of the vehicle 102 and/or identified object(s) within the surrounding environment of the vehicle 102. The flight control system 136 can be configured to perform actuator command task(s) such as, for example, generating and/or providing actuator command(s) associated with the motion plan(s) to one or more control device(s) 122 of the vehicle 102.

By way of example, the system 112 (e.g., the surveillance system instance 130) can determine one or more object location(s) for object(s) proximate to the vehicle 102 based, at least in part, on the radar data 480 (e.g., received via the radar assemblies 124A). For example, the radar data 480 can be input to an object detection algorithm including one or more classical algorithms, machine-learning model(s) (e.g., supervised model(s), unsupervised model(s), neural network, linear model(s), non-linear model(s), etc.), etc. configured to detect one or more airborne objects (e.g., location, speed, altitude, etc.), landing areas, landmarks, etc. based on radar data samples (e.g., digitalized radar signal(s), etc.). The object detection algorithms, for example, can include one or more machine-learning model(s) trained using one or more machine-learning techniques (e.g., unsupervised, supervised, etc.) to identify and/or track airborne (and/or other) objects. As an example, the object detection algorithms can include machine-learning model(s) trained via backpropagation using labelled training data indicative of radar signals and corresponding objects (and/or the location, speed, altitude, etc. thereof).

As another example, the system 112 (e.g., guidance system instance(s) 134) can determine flight maneuver(s) based, at least in part, on the vehicle location (e.g., as determined by the localization system instance(s) 132) and/or the object location(s) (e.g., as determined by the surveillance system instance 130). For instance, the system 112 (e.g., guidance system instance(s) 134) can determine the flight maneuver(s) based, at least in part, on the performance of trajectory planning and/or obstacle avoidance. The flight maneuver(s), for example, can include one or more directional movements to avoid an airborne object, create a buffer distance between the vehicle 102 and the airborne object, and/or perform one or more landing/take-off/navigational procedures. The guidance system instance(s) 134 can receive one or more constraint(s) such as, for example, a localization constraint (e.g., indicative of a current location for the vehicle 102) and/or an obstacle detection constraint (e.g., indicative of one or more objects within the surrounding environment if the vehicle 102), model predictive control for the vehicle 102 based, at least in part, on the constraints, and determine one or more aircraft maneuvers.

As one example, the system 112 (e.g., guidance system instance(s) 134) can be configured to perform a landing zone assessment in preparation for a landing maneuver. To do so, the system 112 (e.g., guidance system instance(s) 134) can input radar signals indicative of a landing area to a semantic landing assessment machine-learned model (e.g., neural network, non-linear model(s), linear model(s), etc.) configured (e.g., trained, etc.) to output one or more semantic labels based, at least in part, on the input radar signals. The semantic labels, for example, can identify one or more object(s) within a landing area of the vehicle 102. As another example, the system 112 (e.g., guidance system instance(s) 134) can determine an occupancy grid (e.g., via one or more classical algorithms, etc.). The system 112 (e.g., guidance system instance(s) 134) can determine an equation of a plane for each grid point of the occupancy grid and determine whether a landing area is occupied based on the slope, altitude, and/or variance of the equation. The guidance system instance(s) 134 can model the predicted control for the vehicle 102 based, at least in part, on whether the landing zone is occupied and determine one or more landing maneuvers based, at least in part, the predicted control for the vehicle 102 and the occupancy of the landing zone.

The autonomy computing system 112 (e.g., flight control system instance(s) 136) can initiate a motion of the vehicle 102 based, at least in part, on the vehicle location, the flight maneuvers, and/or the object(s) proximate to the vehicle 102. To do so, the system 112 can generate actuator command(s) (e.g., actuator command(s) 495 of FIG. 4) based, at least in part, on the one or more flight maneuvers and provide the actuator command(s) to one or more control device(s) 122 of the vehicle 102. In some cases, the actuator command(s) can be generated based, at least in part, on one or more control parameter(s) (e.g., types of firmware, max speed, max current, controller ratings, energy consumption, phase(s), etc.) associated with the control device(s) 122. In this manner, the flight control system instance(s) 136 can generate different actuator command(s) 495 for different control device(s) 122 to initiate the same motion of the aerial vehicle.

In some implementations, the autonomy computing system 112 can store (e.g., in a high speed data recorder) data indicative of the vehicle location, the object location(s), the flight maneuver(s), raw radio-frequency data (e.g., GNSS data, APNT data, Radar data, etc.), and/or other sensor data (e.g., inertial data, etc.) in external memory device(s) 114. The data, for example, can be stored to enable offline testing (e.g., via data replay) for algorithms (e.g., classical algorithms, machine-learning algorithms, etc.) utilized by the autonomy computing system 112. By way of example, raw radio-frequency data (and/or other sensor data) can be used to test algorithms offline using data replay techniques.

In addition, or alternatively, the stored data can be compared to correctional data to determine one or more modification(s) for the autonomy computing system 112 (e.g., surveillance system(s) 130, localization system(s) 132, guidance system(s) 134, flight control system(s) 136, etc.). For example, the autonomy computing system 112 can receive, via one or more communication interfaces 140 (e.g., wired/wireless interfaces, etc.), correctional data from the external sensor network(s) 116. The correctional data can include, for example, additional data (e.g., LiDAR data, image data, etc.) recorded by one or more sensor(s) (e.g., LiDAR sensors, cameras, etc.) of the external sensor network(s) 116. The autonomy computing system 112 can store the correctional data to the external memory device(s) (e.g., high speed data recorder). In this manner, the data indicative of the vehicle location, the object location(s), and/or the flight maneuver(s) can be compared to the correctional data (e.g., out-of-the-loop such as when the vehicle is grounded, etc.) to determine modification(s) for the autonomy computing system 112 (e.g., debug software, maintain hardware, etc.).

The autonomy computing system 112 (e.g., localization system instance(s) 132) can utilize a plurality of sensor processing techniques for determining a current vehicle location. As an example, the system 112 (e.g., localization system instance(s) 132) can perform triple redundant localization using at least three dissimilar signal receivers (e.g., radar assemblies 124A, APNT assemblies 124B, GNSS assemblies 124C, etc.) electrically connected to the circuit board 400. The current vehicle location, for example, can include a geospatial position (and/or any other positional reference) including lateral coordinate(s), longitudinal coordinate(s), and/or altitude measurement(s). The system 112 (e.g., localization system instance(s) 132) can determine a current vehicle location based, at least in part, on a plurality of position estimates generated using at least three dissimilar localization techniques. The vehicle location can be determined by applying a voting algorithm (e.g., deterministic voting algorithms, distributed voting algorithms, etc.) to the plurality of position estimates to obtain a consensus current vehicle location. In some implementations, a consensus, multi-board voting algorithm can be applied to multiple consensus current vehicle locations determined by a plurality of redundant autonomy computing systems. In this way, the consensus, multi-board voting algorithm can provide additional localization redundancy to compensate for potential failures (e.g., due to power failures, bad sensor field of views, loss of sensor connection, etc.) of one or more multiple redundant autonomy computing systems configured to run the same (and/or similar) algorithms.

By way of example, the autonomy computing system 112 (e.g., localization system instance(s) 132, each of a plurality of redundant autonomy computing systems) can determine one or more first, second, and/or third position estimates for the aerial vehicle at a respective time. The first position estimate(s) can be determined based, at least in part, on GNSS data (e.g., GNSS data 490 of FIG. 4) received from the one or more GNSS assemblies 124C. The GNSS data 490, for example, can include one or more navigation satellite signals (e.g., GPS satellite signals, Galileo satellite signals, etc.). The navigation satellite signals, for instance, can include one or more radio time signals received along a line of sight from one or more of a constellation of navigation satellites by the GNSS assembly(s) 124C (e.g., antennas 435 thereof). The one or more radio time signals can be processed (e.g., digitalized, etc.) by the autonomy computing system 112 (e.g., localization system instance(s) 132) via one or more GNSS processing techniques to determine at least one first position estimate for the vehicle 102.

The autonomy computing system 112 (e.g., localization system instance(s) 132) can determine the second position estimate(s) for the vehicle 102 at the respective time based, at least in part, on APNT data (e.g., APNT data 485 of FIG. 4) received from the APNT assembly(s) 124B. The APNT data 485, for example, can include one or more network signal(s) (e.g., cellular network signals, pseudolite signals, ultra-wide band signals, etc.). The network signal(s), for instance, can include one or more radio signals received from one or more network access points (and/or pseudolites, etc.) by the APNT assembly(s) 124B (e.g., antennas 425 thereof). As an example, the network signals can include cellular network signals indicative of one or more cellular access points within range of the APNT assembly(s) 124B. In such a case, the autonomy computing system 112 (e.g., localization system instance(s) 132) can determine an access point location for each of the cellular access points (e.g., via a look-up table and/or information from the network signals) and determine at least one second position estimate based, at least in part, on the access point location for each of the cellular access points. As other examples, the network signals can include one or more radio signals received from pseudolite(s), ultra-wide band access point(s), and/or any other alternative positioning, navigation, and timing sources. In such a case, the radio signals can be processed (e.g., by the localization system instance(s) 132) (e.g., via one or more respective APNT processing techniques) to determine additional second position estimates for the vehicle 102.

The autonomy computing system 112 (e.g., localization system instance(s) 132) can determine the third position estimate(s) for the vehicle 102 at the respective time based, at least in part, on radar data (e.g., radar data 480 of FIG. 4) received from the radar assembly(s) 124A. The radar data 480 can include one or more radar signals. The radar signals can be processed by the autonomy computing system 112 (e.g., localization system instance(s) 132), via one or more processing techniques, to determine a third position estimate. For example, the radar signal(s) can be processed using one or more radar odometry techniques. The radar odometry techniques, for example, can include determining a positional change for the vehicle 102 from a starting time to the respective time based, at least in part, on the radar signals and determining at least one of the one or more third position estimates by applying the positional change to a starting position of the vehicle 102. As another example, the radar signal(s) can be processed using one or more radar terrain reference navigation techniques. For example, the radar signal(s) (e.g., digitalized radar signals, etc.) can be indicative of a terrain within a surrounding environment of the vehicle 102. In such a case, the autonomy system 112 (e.g., localization system instance(s) 132) can determine a third position estimate based, at least in part, on a comparison between the terrain and a pre-determined terrain navigation map. As yet another example, the radar signal(s) can be processed using one or more radar beacon techniques. For instance, the radar data can be indicative of beacon signals received from one or more passive and/or active radar beacons. The autonomy system 112 (e.g., localization system instance(s) 132) can determine one or more beacon positions for the one or more radar beacons based, at least in part, on the beacon signals and determine at least one third position estimate based, at least in part, on the beacon position(s).

Each of the systems 130, 132, 134, 136 can be configured to perform the one or more vehicle task(s) (e.g., localization, etc.) for a plurality of different vehicle types. For example, the autonomy computing system 112 (e.g., the circuit board, the surveillance system 130, localization system 132, guidance system 134, flight control system 136, etc.) can be reconfigurable to apply to a plurality of different vehicle types. By way of example, the same autonomy computing system 112 (e.g., circuit board) can be reconfigured (e.g., without hardware changes) to control any of a plurality of different types of aerial vehicles. In this manner, the autonomy computing system 112 can be transferable between a number of different aircraft without hardware changes.

Figure 6:
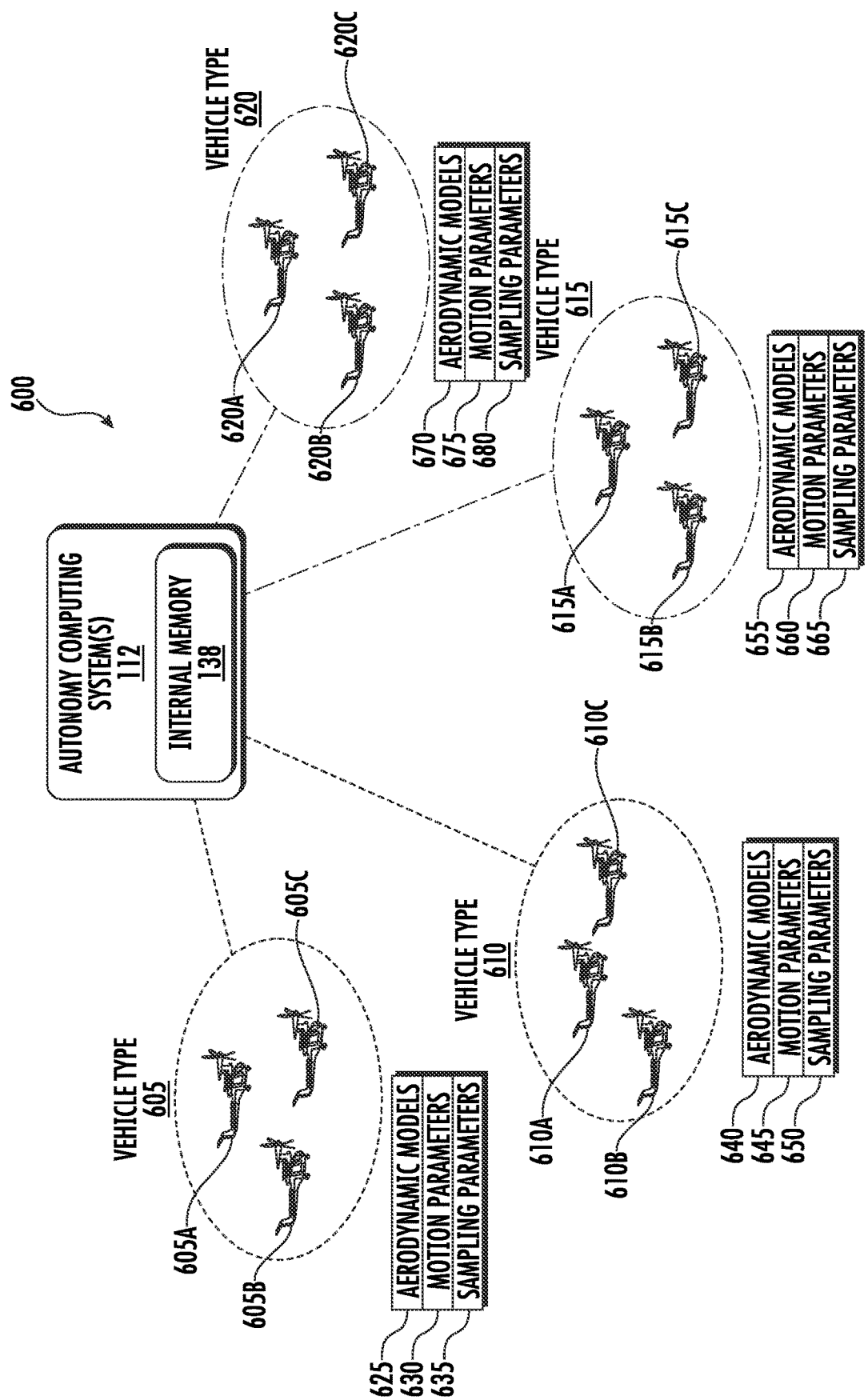
FIG. 6 depicts a reconfigurable autonomy computing system environment according to example embodiments of the present disclosure.

For example, FIG. 6 depicts a reconfigurable autonomy computing system environment 600 according to example embodiments of the present disclosure. As depicted, the reconfigurable autonomy computing system 112 can include an internal memory 138 and be associated with a plurality of different vehicle types 605, 610, 615, 620. For instance, an aerial vehicle (e.g., aerial vehicle(s) 605A, 605B, 605C, 610A, 610B, 610C, 615A, 615B, 615C, 620A, 620B, 620C, etc.) can be associated with an aerial vehicle type 605, 610, 615, 620 (e.g., subscale vehicles, full scale vehicles, eVTOLs, etc.). A respective vehicle type can define a group of aerial vehicles with one or more similar physical attributes. For instance, each vehicle type 605, 610, 615, 620 can include one or more characteristic(s) of an aerial vehicle such as, for example, an aircraft design, device manufacture(s) (e.g., vehicle provider(s), etc.), type of propulsion device(s) (e.g., propeller(s), turbine engine, ramjet, rocket, etc.), number of propulsion device(s) (e.g., one, two, four, eight, etc.), size, weight, and/or any other characteristic defining the flight capabilities of an aerial vehicle. By way of example, a first example vehicle type 605 can include full-scale electric vertical take-off and landing vehicle(s) 605A, 605B, 605C manufactured at least in part by a first vehicle provider; a second example vehicle type 610 can include subscale (e.g., smaller version of the first example vehicle type 605) electric vertical take-off and landing vehicle(s) 610A, 610B, 610C manufactured at least in part by the first vehicle provider; a third example vehicle type 615 can include second aircraft 615A, 615B, 615C manufactured at least in part by the first vehicle provider with one or more different design choices; and a fourth example vehicle type 620 can include another aircraft 620A, 620B, 620C manufactured at least in part by a second vehicle provider.

Each respective aerial vehicle type 605, 610, 615, 620 of the plurality of aerial vehicle types can be associated with one or more respective aerodynamic models 625, 640, 655, 670 and/or radar sampling parameters 635, 650, 665, 680. The aerodynamic models/sampling parameters, for example, can be based, at least in part, on the vehicle characteristics (e.g., size, weight, layout, etc.) of the respective vehicle type 605, 610, 615, 620. The aerodynamic model(s) 625, 640, 655, 670, for example, can include airflow information, resistance information, drag information, weight information, lift information, thrust information, blade tip speed(s) (e.g., maximum speeds, etc.), rotor speed(s) (maximum rotations per minute, etc.), pitch/yaw/roll information, trim information, and/or any other information affecting the aerodynamics of a respective vehicle type 605, 610, 615, 620. The radar sampling parameter(s) 635, 650, 665, 680, for example, can include power (e.g., emission power) information, pulse-width information, filter information, amplifier information, clutter processing information, expected signal noise information, sampling frequency information, and/or any other information affecting radar processing onboard a vehicle of a respective vehicle type 605, 610, 615, 620.

The autonomy computing system(s) 112 can be configured for a respective aerial vehicle (e.g., 605A, 610A, 615A, 620A) associated with a respective vehicle type (e.g., 605, 610, 615, 620) by storing the aerodynamic models 625, 640, 655, 670 (e.g., descriptive of motion parameters 630, 645, 660, 675 (e.g., pitch, roll, yaw, torque, and/or any other parameters for generating desired movements based on a center of gravity and/or other characteristics of an aircraft)) and/or radar sampling parameters 635, 650, 665, 680 (e.g., expected signal noise, sampling frequencies, etc.) corresponding to the respective aerial vehicle type (e.g., 605, 610, 615, 620) on the internal memory 138 of the autonomy computing system 112.

By way of example, the autonomy computing system 112 can be initially configured for a first aerial vehicle 605A associated with a first vehicle type 605. In such a case, the one or more memories 138 of the autonomy computing system 112 can include one or more computer-readable instructions for implementing the various systems of the autonomy computing system 112 (e.g., surveillance system, localization system, guidance system, flight control system, etc.) that include one or more first motion parameters 630 and/or first radar sampling parameters 635 (e.g., expected sensor noise, sampling frequencies, etc.) corresponding to the first vehicle type 605. The one or more first motion parameters 630 and/or first radar sampling parameters 635 can be based, at least in part, on the one or more respective aerodynamic models 625 associated with the first vehicle type 605.

The one or more memories 138 of the same autonomy computing system 112 can be modified to reconfigure the reconfigurable circuit board for use on a second aerial vehicle 610. The one or more modified memories 138 can include modified computer-readable instructions for implementing the various systems of the autonomy computing system 112 (e.g., surveillance system, localization system, guidance system, flight control system, etc.) that include one or more second motion parameters 645 and/or second radar sampling parameters 650 corresponding to the second vehicle type 610. The one or more second motion parameters 645 and/or second radar sampling parameters 650, for example, can be based, at least in part, on the one or more respective aerodynamic models 640 associated with the second vehicle type 610.

Turning again to FIG. 1, the autonomy computing system(s) 112 can include one or a plurality of redundant systems. For example, in some implementations, the vehicle 102 can include multiple redundant autonomy computing systems 112. For instance, the vehicle 102 (e.g., vehicle computing system 110) can include a plurality of circuit boards, with each circuit board capable of performing all aerial vehicle tasks to enable autonomous flight. The multiple redundant circuit boards can be placed in a plurality of different arrangements relative to the vehicle 102. For example, the vehicle 102 can include an arrangement of a plurality of circuit boards disposed on the vehicle 102. Each respective circuit board in the arrangement of the plurality of circuit boards can be associated with a respective position relative to the vehicle 102.

Figure 7:
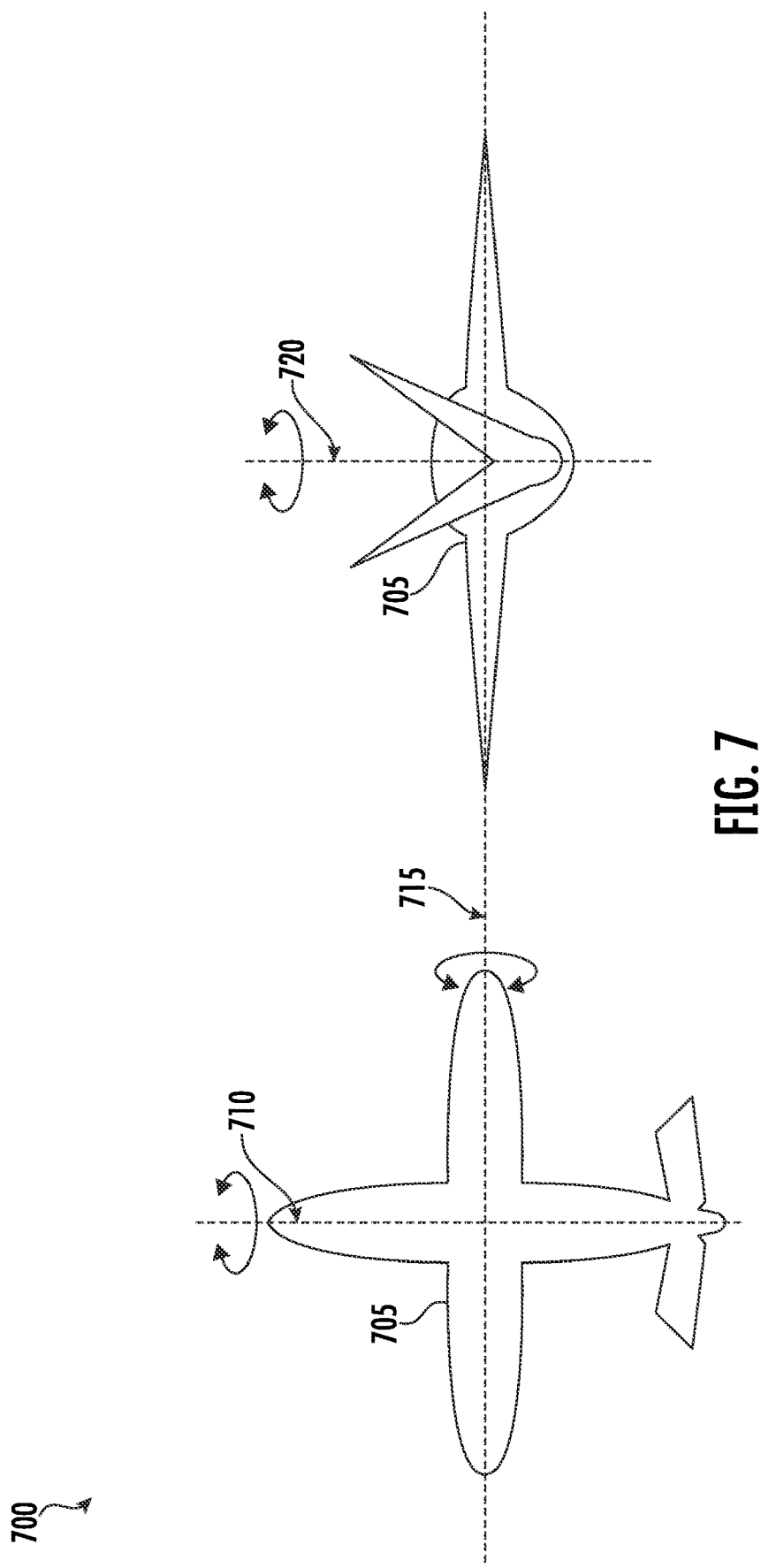
FIG. 7 depicts a number of reference points for an example aerial vehicle according to example embodiments of the present disclosure.

For example, FIG. 7 depicts a number of reference points of example aerial vehicles 700 according to example embodiments of the present disclosure. The vehicles 700 can define a number of reference points, axes, and/or planes. In some implementations, the vehicles 700 can define: a lateral axis (e.g., pitch axis), vertical axis (e.g., yaw axis), a center point (e.g., unloaded center of gravity, loaded center of gravity, geometric center, intersection point of axes, etc.), and/or any other positional reference. The vehicles 700 can define a number of reference frames such as a local North-East-Down (NED) frame defined at a prescribed geodetic position (the current state estimate), cartesian (x, y, z) coordinates relative to frame origin at point, earth-centered/earth-fixed frame Cartesian coordinates relative to frame origin at Earth's center, geodetic frame—elliptical coordinates (latitude, longitude, altitude) relative to frame origin at Earth's center, vehicle body-fixed frame relative to frame origin (e.g., defined as the center of mass), sensor-fixed frame—cartesian coordinates relative to frame origin at sensor's measurement origin, and/or any other suitable reference frame.

Figure 8:
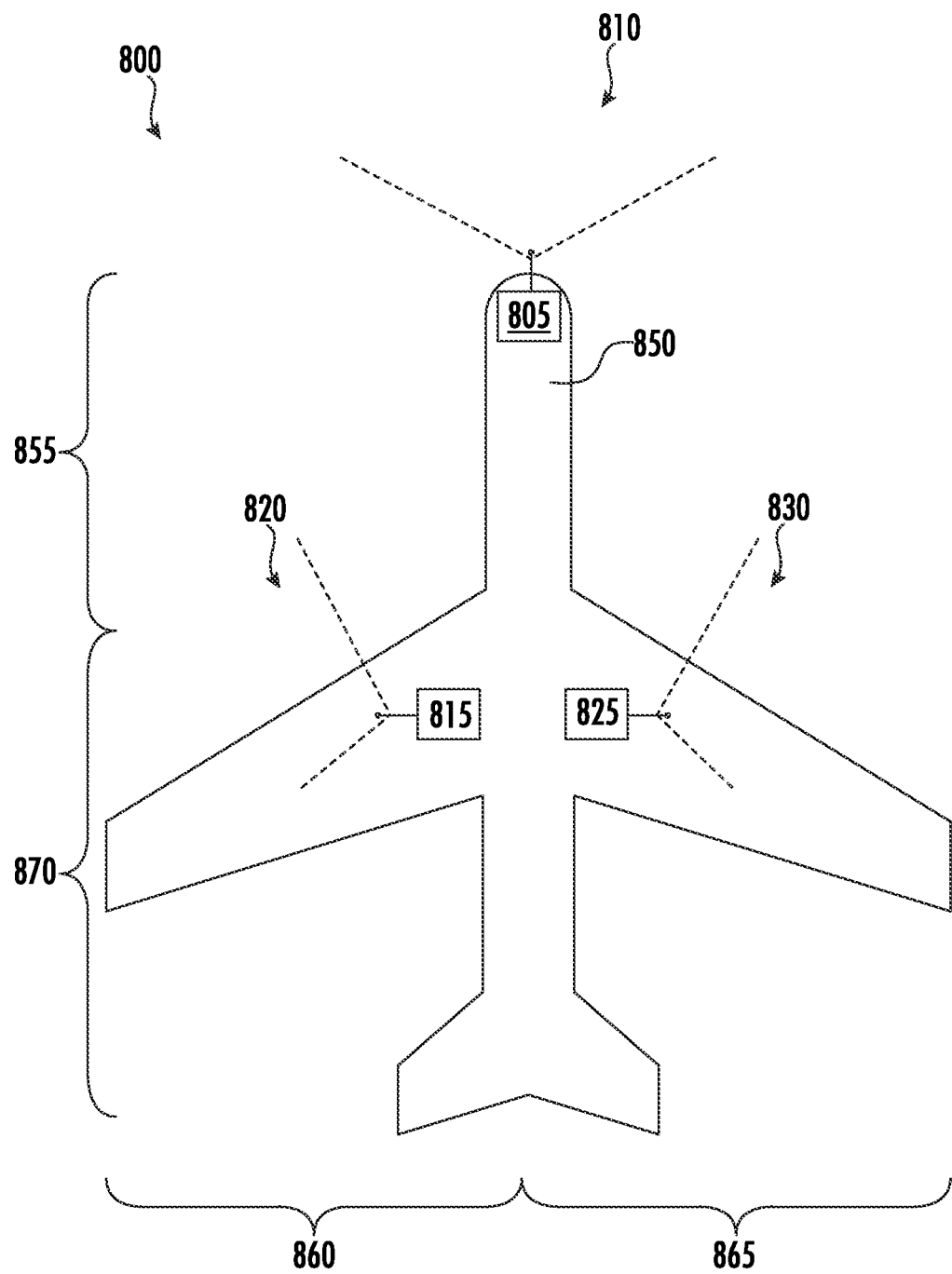
FIG. 8 depicts an example arrangement of autonomy computing systems relative to an example aerial vehicle according to example embodiments of the present disclosure.

FIG. 8 depicts an example arrangement 800 of autonomy computing systems relative to an example aerial vehicle 850 according to example embodiments of the present disclosure. The aerial vehicle 850 can define a front side 855, a first lateral side 860, and/or a second lateral side 865 opposite the first lateral side 860, and/or a rear side 870 opposite the front side 855. The sides 855, 860, 865, 870, for example, can be defined with respect to the vehicle's 850 center of gravity (e.g., as described with reference to FIG. 7).

In some implementations, the plurality of autonomy computing system(s) 805, 815, 825 (e.g., circuit boards) can include a front circuit board 805 disposed on (e.g., mounted to, attached to, affixed to, located at, etc.) the front side 855 (e.g., where the field of view 810 of the sensors of the circuit board 805 are facing forward and/or downward from the aerial vehicle 850, etc.) of the aerial vehicle 850, a first lateral side circuit board 815 disposed on the first lateral side 860 of the aerial vehicle 850 (e.g., where the field of view 820 of the sensors of the circuit board 815 are facing outward from the first lateral side 860), and a second lateral side circuit board 825 disposed on the second lateral side 865 of the aerial vehicle 850 (e.g., where the field of view 830 of the sensors of the circuit board 825 are facing outward from the second lateral side 865).

The plurality of autonomy computing systems 805, 810, 815 can include one or more components and/or be disposed on the aerial vehicle 850 in a particular manner that limits the system(s) 805, 810, 815 effect on drag without sacrificing radio frequency and/or aero-structural performance. By way of example, the plurality of autonomy computing systems 805, 810, 815 can be mounted within the aerial vehicle 850 (e.g., via a structure internal to the aerial vehicle 850). In addition, or alternatively, each of the plurality of autonomy computing systems 805, 810, 815 can include a plurality of radar radomes (e.g., corresponding to respective radar assemblies) and/or conformal GNSS and APNT antennas.

Figure 9:
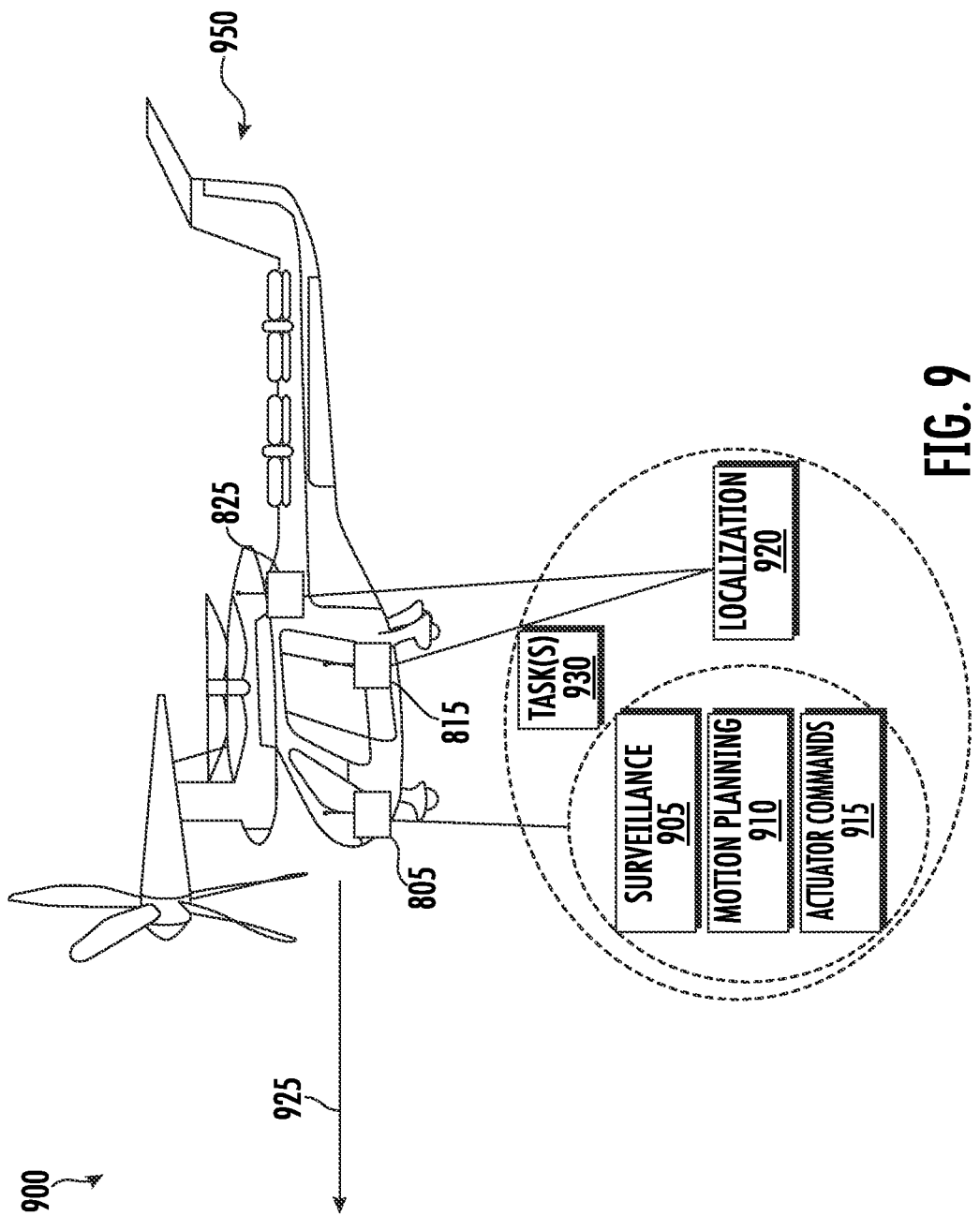
FIG. 9 depicts an example control hierarchy for an autonomous vehicle with a number of redundant autonomy computing systems according to example embodiments of the present disclosure.

FIG. 9 depicts an example control hierarchy 900 for an autonomous vehicle with a number of redundant autonomy computing systems according to example embodiments of the present disclosure. In some implementations, the arrangement of the plurality of circuit boards 805, 815, 825 can include a control hierarchy 900 identifying which board controls each autonomy task 930 for the aerial vehicle 950. For example, the control hierarchy 900 can identify one or more primary circuit board(s) (e.g., controlling board(s)) and/or one or more redundant circuit boards (e.g., noncontrolling board(s)) for performing each of the one or more aerial vehicle tasks 930. The control hierarchy 900 can be based, at least in part, on the respective position of each respective circuit board in the arrangement of the plurality of circuit boards 805, 815, 825. For instance, the control hierarchy 900 can identify the front circuit board 805 as the primary circuit board for the performance of surveillance 905 (e.g., object detection, weather assessment, terrain assessment, landing zone assessment, emergency landing zone assessment, etc.), motion planning 910, and/or actuator command task(s) 915. In addition, or alternatively, the control hierarchy 900 can identify the first lateral side circuit board 815 and the second lateral side circuit board 825 as the primary circuit boards for the performance of the localization task(s) 920.

Additionally and/or alternatively, in some implementations, the control hierarchy 900 can identify each of the circuit boards 805, 815, 825 as redundant (e.g., noncontrolling) circuit boards for performing each of the one or more vehicle tasks 930. For instance, the control hierarchy 900 may not include a primary circuit board in some implementations. Signals from each redundant circuit board 805, 815, 825 can be treated equally, and signals representing a majority value (e.g., a voting-based majority) can be used for performance of surveillance 905 (e.g., object detection, weather assessment, terrain assessment, landing zone assessment, emergency landing zone assessment, etc.), motion planning 910, and/or actuator command task(s) 915. Signals from boards 805, 815, 825 can be considered individually for determining majority values.

In some implementations, the control hierarchy 900 can dynamically change based, at least in part, on the direction of travel 925 and/or a phase of flight of the aerial vehicle 950. The phase of flight, for example, can be indicative of whether the aerial vehicle is in a planning phase, a take-off phase, a climb phase, a cruise phase, a descent phase, an approach phase, a taxi phase, etc. By way example, the control hierarchy 900 can identify the primary board for the performance of the surveillance 905, motion planning 910, and/or actuator command 915 task(s) as the board 805, 815, 825 (e.g., sensors thereof) with a field of view overlapping (at least partially) the aerial vehicle's direction of travel 925. In such a case, the control hierarchy 900 can identify the primary board for the performance of the localization task(s) 920 as the boards (e.g., sensors thereof) with a field of view that does not overlap the aerial vehicle's direction of travel 925. As an example, the primary board for the performance of the surveillance 905, motion planning 910, and/or actuator command task(s) 915 can include the front board 805 in the event that the aerial vehicle 950 is traveling up, down, or straight and/or generally in the forward direction (e.g., as depicted by direction of travel 925). In addition, or alternatively, the primary board for the performance of the surveillance 905, motion planning 910, and/or actuator command 915 task(s) can include the first and/or second lateral side circuit boards 815, 825 in the event the aerial vehicle 950 is hovering (and/or otherwise moving) laterally (e.g., from side to side). This allows for a reconfigurable and real-time selection of onboard computing resources to perform the various autonomous functions of the aerial vehicle 950 in a manner tailored to the current operating parameters of the aerial vehicle 950.

Figure 10:
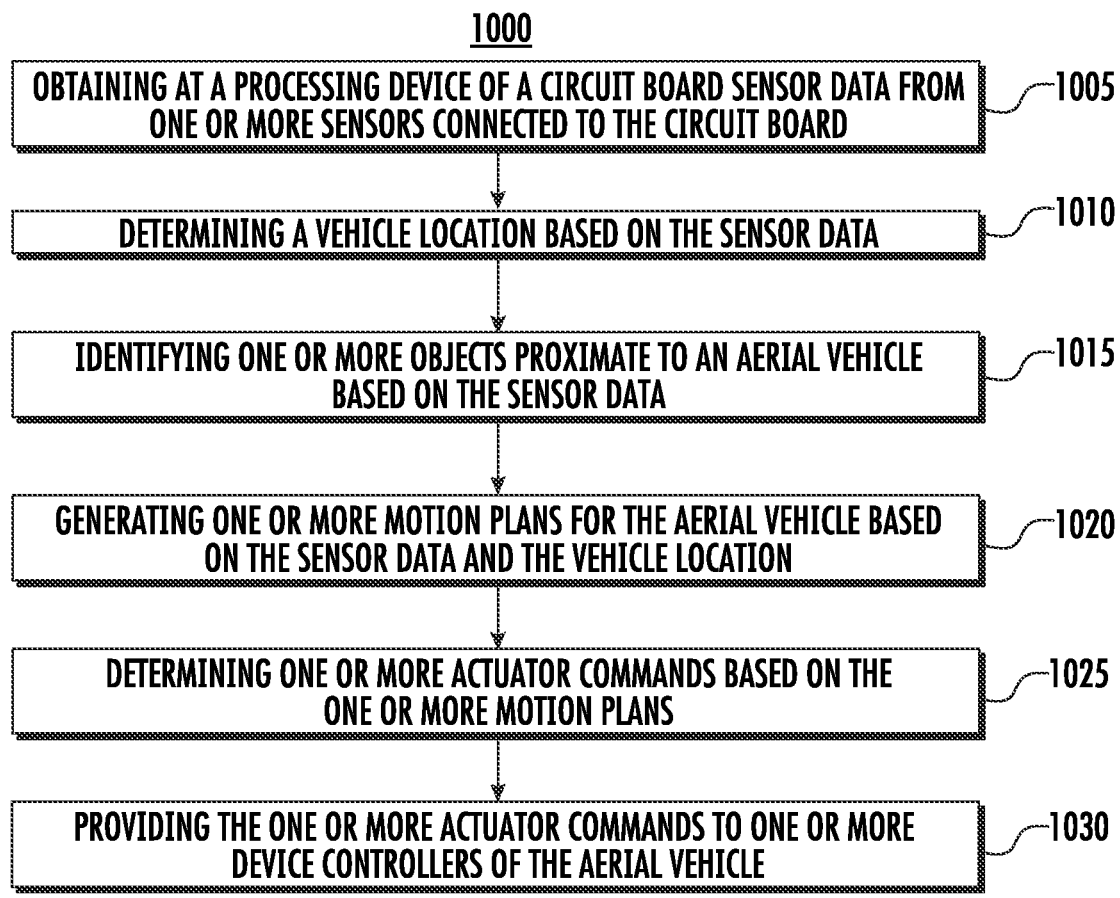
FIG. 10 depicts an example method for controlling the motion of an aerial vehicle according to example embodiments of the present disclosure.

FIG. 10 depicts an example method 1000 for controlling the motion of an aerial vehicle according to example embodiments of the present disclosure. One or more portion(s) of the method 1000 can be implemented by a computing system that includes one or more computing devices such as, for example, the computing systems described with reference to the other figures (e.g., the vehicle computing system 110, autonomy computing system 112, circuit board 400, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-9, 12-13, etc.), for example, to perform aerial vehicle tasks. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1005, the method 1000 can include obtaining, at a processor device of a circuit board, sensor data from one or more sensors connected to the circuit board. For example, a computing system (e.g., autonomy computing system 112, etc.) can obtain, at the processor device of the circuit board, the sensor data from the one or more sensors connected to the circuit board.

At 1010, the method 1000 can include determining a vehicle location based on the sensor data. For example, the computing system (e.g., autonomy computing system 112, etc.) can determine the vehicle location based on the sensor data.

At 1015, the method 1000 can include identifying one or more objects proximate to an aerial vehicle based, at least in part, on the sensor data. For example, the computing system (e.g., autonomy computing system 112, etc.) can identify the one or more objects proximate to the aerial vehicle based, at least in part, on the sensor data.

At 1020, the method 1000 can include generating one or more motion plans for the aerial vehicle based, at least in part, on the sensor data and the vehicle location. For example, the computing system (e.g., autonomy computing system 112, etc.) can generate the one or more motion plans for the aerial vehicle based, at least in part, on the sensor data and the vehicle location.

At 1025, the method 1000 can include determining one or more actuator commands based, at least in part, on the one or more motion plans. For example, the computing system (e.g., autonomy computing system 112, etc.) can determine the one or more actuator commands based, at least in part, on the one or more motion plans.

At 1030, the method 1000 can include providing the one or more actuator commands to one or more device controllers of the aerial vehicle. For example, the computing system (e.g., autonomy computing system 112, etc.) can provide the one or more actuator commands to one or more device controllers of the aerial vehicle.

Figure 11:
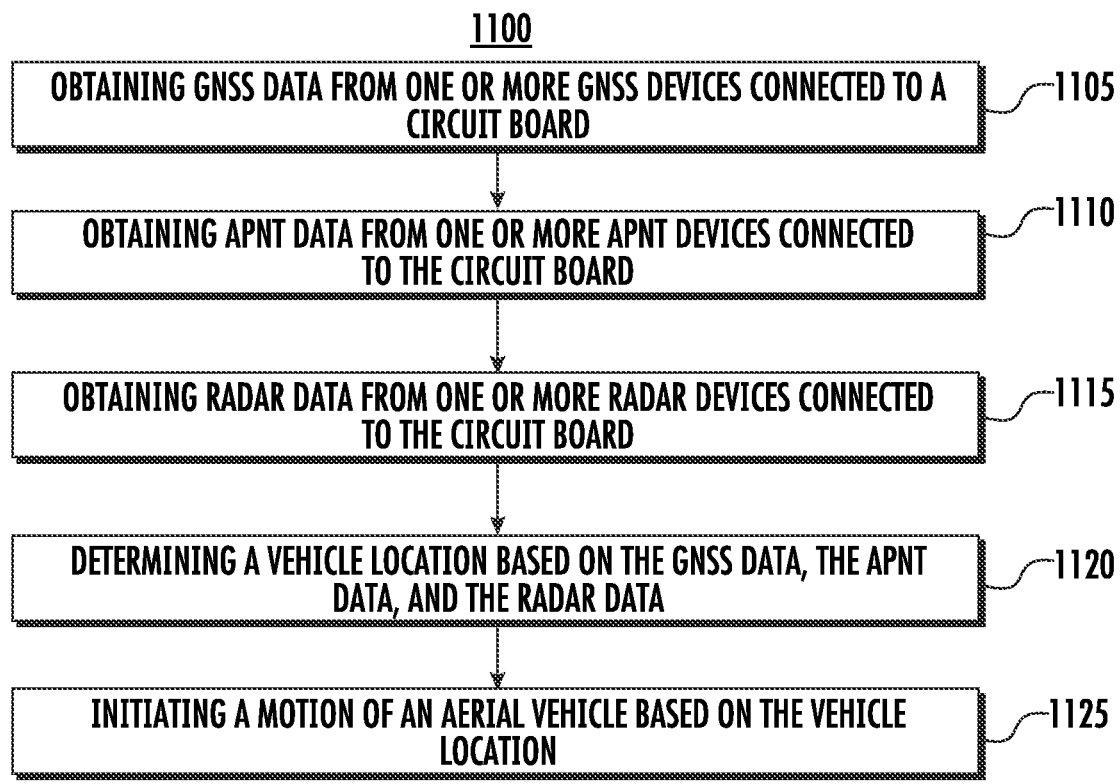
FIG. 11 depicts an example method for localizing an aerial vehicle according to example embodiments of the present disclosure.

FIG. 11 depicts an example method 1100 for localizing an aerial vehicle according to example embodiments of the present disclosure. One or more portion(s) of the method 1100 can be implemented by a computing system that includes one or more computing devices such as, for example, the computing systems described with reference to the other figures (e.g., the vehicle computing system 110, autonomy computing system 112, circuit board 400, etc.). Each respective portion of the method 1100 can be performed by any (or any combination) of one or more computing devices. Moreover, one or more portion(s) of the method 1000 can be implemented as an algorithm on the hardware components of the device(s) described herein (e.g., as in FIGS. 1-9, 12-13, etc.), for example, to determine a current location for an aircraft. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally, or alternatively, by other systems.

At 1105, the method 1100 can include obtaining GNSS data from one or more GNSS devices connected to a circuit board. For example, a computing system (e.g., autonomy computing system 112, etc.) can obtain the GNSS data from the one or more GNSS devices connected to the circuit board.

At 1110, the method 1100 can include obtaining APNT data from one or more APNT devices connected to the circuit board. For example, the computing system (e.g., autonomy computing system 112, etc.) can obtain the APNT data from the one or more APNT devices connected to the circuit board.

At 1115, the method 1100 can include obtaining radar data from one or more radar devices connected to the circuit board. For example, the computing system (e.g., autonomy computing system 112, etc.) can obtain the radar data from the one or more radar devices connected to the circuit board.

At 1120, the method 1100 can include determining a vehicle location based on the GNSS data, the APNT data, and/or the radar data. For example, the computing system (e.g., autonomy computing system 112, etc.) can determine the vehicle location based on the GNSS data, the APNT data, and/or the radar data. In some implementations, the vehicle location can be based on additional information such as, as examples, inertial data (e.g., from one or more inertial measurement units), communication data (e.g., indicative of relative vehicle locations, third party location predictions, etc.), and/or any other information associated with the location of an aerial vehicle.

At 1125, the method 1100 can include initiating a motion of an aerial vehicle based on the vehicle location. For example, the computing system (e.g., autonomy computing system 112, etc.) can initiate the motion of the aerial vehicle based on the vehicle location.

Figure 12:
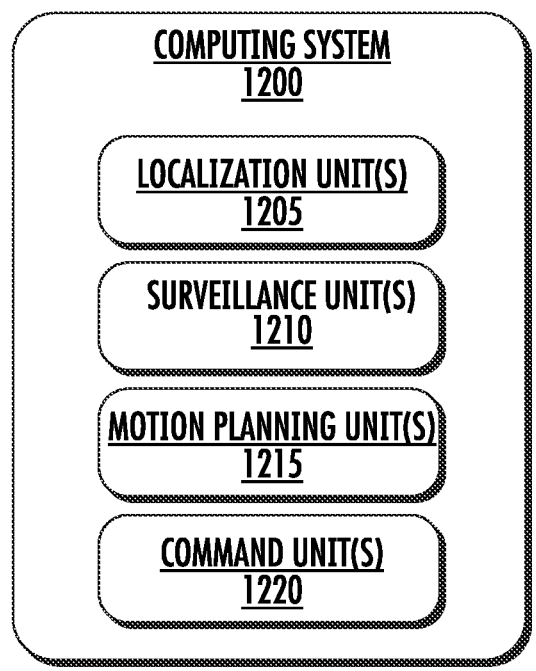
FIG. 12 depicts an example system with various means for performing operations and functions according to example embodiments of the present disclosure.

FIG. 12 depicts an example system 1200 with various means for performing operations and functions according to example embodiments of the present disclosure. One or more operations and/or functions in FIG. 12 can be implemented and/or performed by one or more devices (e.g., one or more computing devices of the autonomy computing system 112) or systems including, for example, the autonomy computing system 112 shown in FIGS. 1, 4, and 5.

Various means can be configured to perform the methods and processes described herein. For example, the system 1200 can include localization unit(s) 1205, surveillance unit(s) 1210, motion planning unit(s) 1215, command unit(s) 1220, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., localization unit(s) 1205, etc.) can be configured to determine a current location for an aerial vehicle. The means (e.g., surveillance unit(s) 1210, etc.) can be configured to identify object(s) within the surrounding environment of the aerial vehicle. The means (e.g., motion planning unit(s) 1215, etc.) can be configured to generate motion plan(s) for the aerial vehicle based, at least in part, on the current location of the vehicle and/or identified object(s) within the surrounding environment of the vehicle. The means (e.g., command unit(s) 1220, etc.) can be configured to generate and/or provide actuator command(s) associated with the motion plan(s) to one or more control device(s) of the aerial vehicle.

Figure 13:
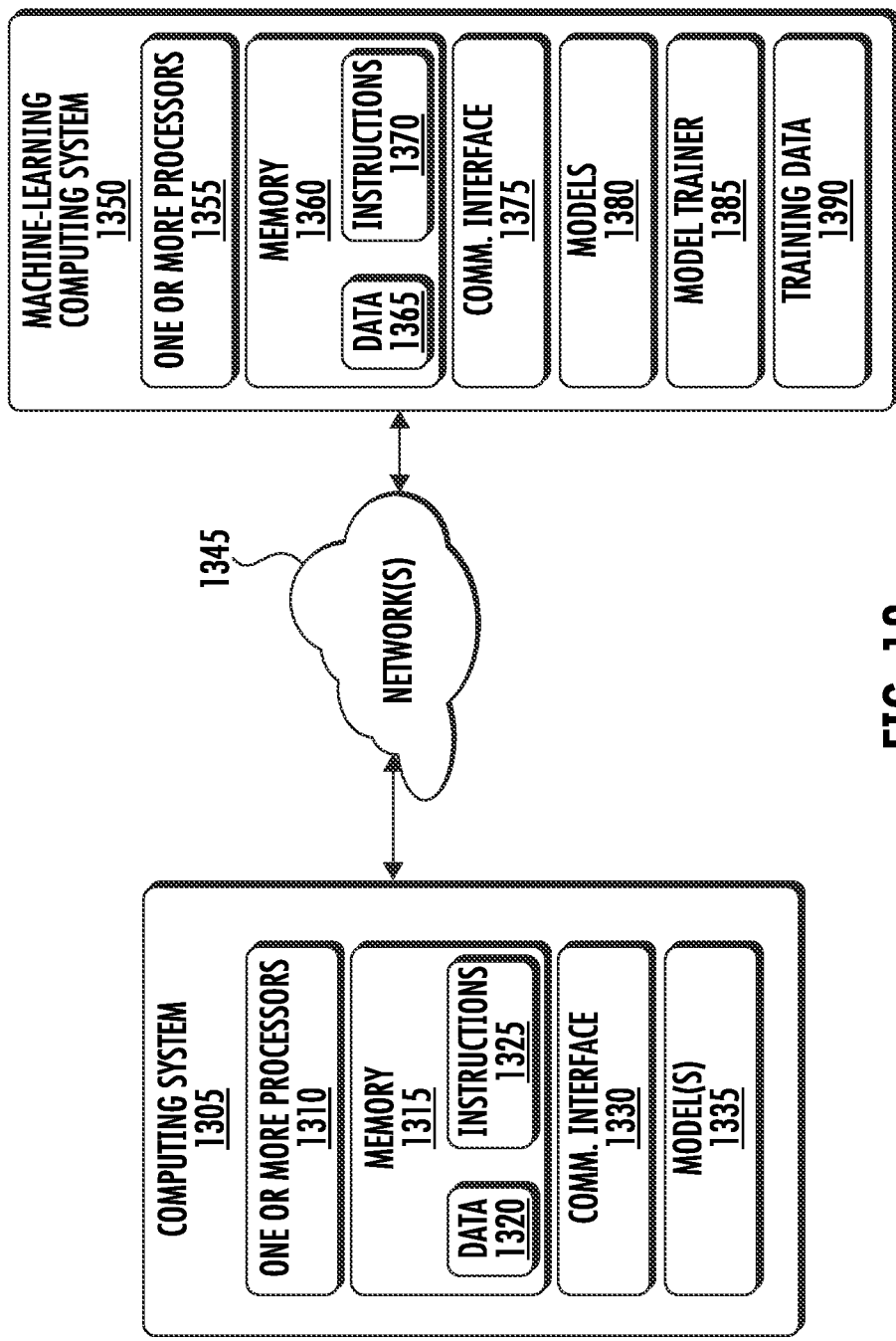
FIG. 13 depicts an example computing system according to example embodiments of the present disclosure.

FIG. 13 depicts an example computing system 1300 according to example embodiments of the present disclosure. The system 1300 includes an autonomy computing system 1305 and a server computing system 1350 that are communicatively coupled over a network 1345.

The autonomy computing system 1305 includes one or more processors 1310 and a memory 1315. The one or more processors 1310 can be any suitable processor device (e.g., a processor core, a microprocessor, an ASIC, a GPU, an FPGA, a controller, a microcontroller, etc.) and can be one processor or a plurality of processors that are operatively connected. The memory 1315 can include one or more non-transitory computer-readable storage media, such as RAM, ROM, EEPROM, EPROM, flash memory devices, magnetic disks, etc., and combinations thereof. The memory 1315 can store data 1320 and instructions 1325 which are executed by the processor 1310 to cause the autonomy computing system 1305 to perform operations.

In some implementations, the autonomy computing system 1305 can store or include one or more machine-learning models 1335 and/or one or more non-machine-learning algorithms. The machine-learning models 1335 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the machine-learning models 1335 can be received from the server computing system 1350 over network 1345, stored in the autonomy computing system memory 1315, and then used or otherwise implemented by the one or more processors 1310. In some implementations, the autonomy computing system 1305 can implement multiple parallel instances of machine-learning models 1335.

More particularly, the machine-learning models 1335 can be utilized to perform one or more aerial vehicle tasks. By way of example, the machine-learning models 1335 can include one or more object detection model(s) configured to identify and/or track one or more airborne objects based, at least in part, on raw radar sensor signals. In addition, or alternatively, the machine-learning models 1335 can include one or more localization model(s) configured to determine a current location for an aircraft, one or more motion planning model(s) for determining an optimal motion plan for an aircraft, and/or any other machine-learning models for performing autonomy tasks for an aerial vehicle.

Additionally, or alternatively, one or more machine-learning models 1380 can be included in or otherwise stored and implemented by the server computing system 1350 that communicates with the autonomy computing system 1305. The server computing system 1350 includes one or more processors 1355 and a memory 1360. The one or more processors 1355 can be any suitable processor device (e.g., a processor core, a microprocessor, an ASIC, a GPU, an FPGA, a controller, a microcontroller, etc.) and can be one processor or a plurality of processors that are operatively connected. The memory 1360 can include one or more non-transitory computer-readable storage media, such as RAM, ROM, EEPROM, EPROM, flash memory devices, magnetic disks, etc., and combinations thereof. The memory 1360 can store data 1365 and instructions 1370 which are executed by the processor 1355 to cause the server computing system 1350 to perform operations.

In some implementations, the server computing system 1350 includes or is otherwise implemented by one or more server computing devices. In instances in which the server computing system 1350 includes plural server computing devices, such server computing devices can operate according to sequential computing architectures, parallel computing architectures, or some combination thereof.

As described above, the server computing system 1350 can store or otherwise include one or more machine-learning models 1380. For example, the models 1380 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The autonomy computing system 1305 and/or the server computing system 1350 can train the models 1335 and/or 1380 via interaction with a model trainer 1385. The model trainer 1385 can be configured to train the machine-learned models 1335 and/or 1380 stored at the e autonomy computing system 1305 and/or the server computing system 1350 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 1385 can perform a number of generalization techniques (e.g., weight decays, dropouts, etc.) to improve the generalization capability of the models being trained. In particular, the model trainer 1385 can train the machine-learning models 1335 and/or 1380 based on a set of training data 1390. The training data 1390 can include, for example, previously recorded radar signals labeled for one or more tasks. As an example, the radar signals can be labeled to indicate whether the signals correspond to the presence of one or more objects, a speed of the objects, an object type associated with the object(s), etc.

The model trainer 1385 includes computer logic utilized to provide desired functionality. The model trainer 1385 can be implemented in hardware, firmware, and/or software controlling a general purpose processor. For example, in some implementations, the model trainer 1385 includes program files stored on a storage device, loaded into a memory and executed by one or more processors. In other implementations, the model trainer 1385 includes one or more sets of computer-executable instructions that are stored in a tangible computer-readable storage medium such as RAM, hard disk, or optical or magnetic media.

The network 1345 can be one or more of any type of communications network, such as a local area network (e.g., intranet), wide area network (e.g., Internet), or some combination thereof and can include any number of wired or wireless links. In general, communication over the network 180 can be carried through one or more of any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIGS. 1-13 illustrate example embodiments and methods that can be used to implement the present disclosure. Other computing systems can be used as well. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices. While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A circuit board in communication with one or more device controllers, the circuit board comprising:
   a processor device;
   a plurality of sensor assemblies electrically connected to the processor device and configured to receive sensor information from one or more sensors, the plurality of sensor assemblies comprising one or more global navigation satellite system (GNSS) assemblies, one or more alternative position navigation and timing (APNT) assemblies, and one or more radio detection and ranging (RADAR) assemblies; and
   one or more memory devices storing computer-readable instructions that when executed cause the processor device to implement a guidance system and a flight control system, wherein the guidance system is configured to generate one or more motion plans for an aircraft and the flight control system is configured to provide one or more actuator commands associated with the one or more motion plans to the one or more device controllers,
   wherein the circuit board is configured, for one or more aircraft tasks, to be:
      for a first direction of travel or a first phase of flight of the aircraft, a primary circuit board in a control hierarchy relative to a second circuit board of the aircraft; and
      for a second direction of travel or a second phase of flight of the aircraft, a redundant circuit board in the control hierarchy relative to the second circuit board.

2. The circuit board of claim 1, wherein the computer-readable instructions comprise first computer-readable instructions that when executed cause the processor device to implement a first guidance system configured to generate one or more first motion plans for a first aircraft type and a first flight control system configured to provide one or more first actuator commands associated with the one or more first motion plans to one or more first device controllers of the first aircraft type.

3. The circuit board of claim 2, wherein the first aircraft type is one of a plurality of vehicle types, wherein each respective aircraft type of the plurality of vehicle types is associated with one or more respective aerodynamic models.

4. The circuit board of claim 3, wherein the first computer-readable instructions comprise one or more first motion parameters or one or more first radar sampling parameters corresponding to the first aircraft type, wherein the one or more first motion parameters or the one or more first radar sampling parameters are based, at least in part, on one or more first respective aerodynamic models associated with the first aircraft type.

5. The circuit board of claim 4, wherein the computer-readable instructions are modifiable to reconfigure the circuit board for use on a second vehicle of a second aircraft type, wherein modified computer-readable instructions comprise instructions that when executed cause the processor device to implement a second guidance system configured to generate one or more second motion plans for the second aircraft type and a second flight control system configured to provide one or more second actuator commands associated with the one or more second motion plans to one or more second device controllers of the second aircraft type.

6. The circuit board of claim 5, wherein the modified computer-readable instructions comprise one or more second motion parameters or one or more second radar sampling parameters corresponding to the second aircraft type, wherein the one or more second motion parameters are based, at least in part, on one or more second respective aerodynamic models associated with the second aircraft type.

7. The circuit board of claim 1, further comprising one or more board layers, the one or more board layers comprising at least one substrate layer and at least one conductive layer, wherein the at least one conductive layer comprises a plurality of circuit tracks for electrically connecting the processor device, the plurality of sensor assemblies, and the one or more memory devices.

8. The circuit board of claim 7, wherein the plurality of sensor assemblies are disposed on the circuit board and electrically connected to the processor device via the plurality of circuit tracks of the at least one conductive layer.

9. The circuit board of claim 8, wherein at least one sensor assembly of the plurality of sensor assemblies comprises at least one radiofrequency front end disposed on the circuit board, wherein the at least one radiofrequency front end is configured to receive one or more antenna signals from at least one antenna of the at least one sensor assembly or one or more simulated signals from at least one simulation device, wherein the at least one radiofrequency front end is configured to provide data indicative of the one or more antenna signals or the one or more simulated signals to the processor device.

10. The circuit board of claim 8, wherein the one or more GNSS assemblies comprise at least one GNSS receiver antenna disposed on the circuit board and electrically connected to the processor device via at least a first track of the plurality of circuit tracks,
   wherein the one or more APNT assemblies comprise at least one APNT receiving antenna disposed on the circuit board and electrically connected to the processor device via at least a second track of the plurality of circuit tracks, and wherein the one or more radar assemblies comprise at least one radar receiving antenna and at least one radar transmitter antenna disposed on the circuit board and electrically connected to the processor device via at least a third track of the plurality of circuit tracks.

11. The circuit board of claim 1, wherein the processor device is a field-programmable gate array, wherein the field-programmable gate array is configured to receive sensor data directly from the plurality of sensor assemblies and perform sensor processing on the sensor data.

12. An aircraft comprising:
an arrangement of a plurality of circuit boards mounted to the aircraft, wherein each circuit board of the plurality of circuit boards is located at a different position onboard the aircraft, wherein the arrangement of the plurality of circuit boards comprises a control hierarchy indicative of a primary circuit board and one or more redundant circuit boards for performing each of one or more aircraft tasks, and wherein each circuit board of the plurality of circuit boards comprises:
a processor device;
a plurality of sensor assemblies electrically connected the processor device and configured to receive sensor information from one or more sensors, the plurality of sensor assemblies comprising one or more global navigation satellite system (GNSS) assemblies, one or more alternative position navigation and timing (APNT) assemblies, and one or more radio detection and ranging (RADAR) assemblies; and
one or more memory devices storing computer-readable instructions that when executed cause the processor device to implement a surveillance system, a localization system, a guidance system, and a flight control system, wherein the surveillance system, the localization system, the guidance system, and the flight control system are configured to perform the one or more aircraft tasks;
wherein a first circuit board of the plurality of circuit boards is configured, for one or more autonomy tasks, to be:
for a first direction of travel or a first phase of flight of the aircraft, the primary circuit board in the control hierarchy relative to a second circuit board of the plurality of circuit boards; and
for a second direction of travel or a second phase of flight of the aircraft, a redundant circuit board in the control hierarchy relative to the second circuit board.

13. The aircraft of claim 12, wherein each respective circuit board in the arrangement of the plurality of circuit boards is associated with a respective position relative to the aircraft, and wherein the control hierarchy is based, at least in part, on the respective position of each respective circuit board in the arrangement of the plurality of circuit boards.

14. The aircraft of claim 13, wherein the control hierarchy is further configured to be dynamically changeable based, at least in part, on the direction of travel or the phase of flight of the aircraft.

15. The aircraft of claim 13, wherein the aircraft defines a front side, a first lateral side, a second lateral side opposite the first lateral side, and a rear side opposite the front side, and wherein the plurality of circuit boards comprise a front circuit board located at the front side of the aircraft, a first lateral side circuit board located at the first lateral side of the aircraft, and a second lateral side circuit board located at the second lateral side of the aircraft.

16. The aircraft of claim 15, wherein the surveillance system is configured to perform one or more surveillance tasks, the localization system is configured to perform one or more localization tasks, the guidance system is configured to perform one or more motion planning tasks, and the flight control system is configured to perform one or more actuator command tasks, wherein the control hierarchy identifies the front circuit board as primary circuit board for performance of the one or more surveillance tasks, the one or more motion planning tasks, and the one or more actuator command tasks, and wherein the control hierarchy identifies the first lateral side circuit board and the second lateral side circuit board as primary circuit boards for performance of the one or more localization tasks.

17. An aircraft comprising:
one or more processor devices; and
one or more non-transitory computer-readable media that collectively store instructions that, when executed by the one or more processor devices, cause the one or more processor devices to perform operations, the operations comprising:
obtaining global navigation satellite system (GNSS) data from one or more GNSS assemblies electrically connected to the one or more processor devices;
obtaining alternative position navigation and time (APNT) data from one or more APNT assemblies electrically connected to the one or more processor devices;
obtaining radio detection and ranging (radar) data from one or more radar assemblies electrically connected to the one or more processor devices;
determining a vehicle location based, at least in part, on the GNSS data, the APNT data, and the radar data;
initiating a motion of the aircraft based, at least in part, on the vehicle location;
for one or more aircraft tasks, controlling, for a first direction of travel or a first phase of flight of the aircraft, the aircraft as a primary controller in a control hierarchy relative to a second controller of the aircraft; and
for the one or more aircraft tasks, controlling, for a second direction of travel or a second phase of flight of the aircraft, the aircraft as a redundant controller in the control hierarchy relative to the second controller.

18. The aircraft of claim 17, wherein the operations further comprise:
determining one or more first position estimates for the aircraft at a respective time based, at least in part, on the GNSS data;
determining one or more second position estimates for the aircraft at the respective time based, at least in part, on the APNT data; and
determining one or more third position estimates for the aircraft at the respective time based, at least in part, on the radar data.

19. The aircraft of claim 18, wherein the vehicle location is determined by applying a voting algorithm to the one or more first position estimates, the one or more second position estimates, and the one or more third position estimates.

20. The aircraft of claim 19, wherein initiating the motion of the aircraft comprises:
determining one or more object locations for one or more objects proximate to the aircraft based, at least in part, on the radar data;

determining one or more flight maneuvers based, at least in part, on the vehicle location and the one or more object locations; and generating one or more actuator commands for initiating the motion of the aircraft based, at least in part, on the one or more flight maneuvers.

* * * * *